US012764306B2

(12) United States Patent
Karczewicz et al.

(10) Patent No.: US 12,764,306 B2
(45) Date of Patent: Oct. 13, 2026

(54) INTRA SPATIAL GEOMETRIC PARTITION MODE AND MATRIX INTRA PARTITION MODE TRANSFORM SET SELECTION IN VIDEO CODING

(71) Applicant: QUALCOMM Incorporated, San Diego, CA (US)

(72) Inventors: Marta Karczewicz, San Diego, CA (US); Muhammed Zeyd Coban, Carlsbad, CA (US); Vadim Seregin, San Diego, CA (US)

(73) Assignee: QUALCOMM Incorporated, San Diego, CA (US)

( * ) Notice: Subject to any disclaimer, the term of this patent is extended or adjusted under 35 U.S.C. 154(b) by 17 days.

(21) Appl. No.: 19/075,124

(22) Filed: Mar. 10, 2025

(65) Prior Publication Data

US 2025/0330613 A1 Oct. 23, 2025

Related U.S. Application Data

(60) Provisional application No. 63/636,569, filed on Apr. 19, 2024.

(51) Int. Cl.
*H04N 19/159* (2014.01)
*H04N 19/12* (2014.01)
(Continued)

(52) U.S. Cl.
CPC ........... *H04N 19/159* (2014.11); *H04N 19/12* (2014.11); *H04N 19/176* (2014.11); *H04N 19/61* (2014.11)

(58) Field of Classification Search
CPC .... H04N 19/159; H04N 19/12; H04N 19/176; H04N 19/61; H04N 19/122; H04N 19/593; H04N 19/70
See application file for complete search history.

(56) References Cited

U.S. PATENT DOCUMENTS

| | | | | |
|---|---|---|---|---|
| 11,671,589 B2 * | 6/2023 | Li | ........................ | H04N 19/105 375/240.02 |
| 12,069,246 B2 * | 8/2024 | Li | ........................ | H04N 19/105 |

(Continued)

OTHER PUBLICATIONS

Bross B., et al., "Versatile Video Coding (Draft 10)", Joint Video Experts Team (JVET) of ITU-T SG 16 WP 3 and ISO/IEC JTC 1/SC 29/WG 11, 19th Meeting: by teleconference, Jun. 22-Jul. 1, 2020, 131th MPEG Meeting, Jun. 29, 2020-Jul. 3, 2020, Online, (Motion Picture Expert Group or ISO/IEC JTC1/SC29/WG11), No. m54716, JVET-S2001-v1, Jun. 23, 2020, 526 Pages, XP030289297, Sec. 8.7.4.3.

(Continued)

*Primary Examiner* — James M Pontius
(74) *Attorney, Agent, or Firm* — Shumaker & Sieffert, P. A.

(57) ABSTRACT

Example methods, devices, and computer-readable media are described. An example device includes one or more processors configured to determine to use a spatial geometric partition mode (SGPM) for a current block and perform a Sobel-based intra prediction direction derivation. The one or more processors are configured to determine a first intra prediction mode and a second intra prediction mode based on an output of the Sobel-based intra prediction direction The one or more processors are configured to determine a first set of transforms based on the first intra prediction mode and determine a second set of transforms based on the second intra prediction mode. The one or more processors are configured to decode the current block based on the SGPM, and at least one of the first set of transforms or the second set of transforms.

20 Claims, 7 Drawing Sheets

(51) Int. Cl.
*H04N 19/176* (2014.01)
*H04N 19/61* (2014.01)

(56) References Cited

U.S. PATENT DOCUMENTS

| | | | | |
|---|---|---|---|---|
| 2024/0137542 | A1* | 4/2024 | Zhao | H04N 19/11 |
| 2024/0179303 | A1* | 5/2024 | Park | H04N 19/176 |
| 2024/0259570 | A1* | 8/2024 | Park | H04N 19/159 |
| 2025/0030894 | A1* | 1/2025 | Huo | H04N 19/176 |
| 2025/0233978 | A1* | 7/2025 | Kim | H04N 19/105 |
| 2025/0240423 | A1* | 7/2025 | Wang | H04N 19/61 |
| 2025/0301136 | A1* | 9/2025 | Karczewicz | H04N 19/11 |
| 2025/0324053 | A1* | 10/2025 | Coban | H04N 19/119 |
| 2025/0330593 | A1* | 10/2025 | Xu | H04N 19/11 |
| 2025/0330645 | A1* | 10/2025 | Coban | H04N 19/593 |
| 2025/0358427 | A1* | 11/2025 | Wang | H04N 19/159 |
| 2026/0012636 | A1* | 1/2026 | Kim | H04N 19/593 |
| 2026/0012641 | A1* | 1/2026 | Karczewicz | H04N 19/122 |
| 2026/0052249 | A1* | 2/2026 | Kim | H04N 19/124 |
| 2026/0067451 | A1* | 3/2026 | Lin | H04N 19/105 |
| 2026/0101032 | A1* | 4/2026 | Liu | H04N 19/117 |
| 2026/0129193 | A1* | 5/2026 | Zhou | H04N 19/117 |
| 2026/0129211 | A1* | 5/2026 | Kim | H04N 19/149 |

OTHER PUBLICATIONS

Coban M (QUALCOMM Inc.)., et al., "AHG12: Multiple Transform Set Selection for Intra LFNST/NSPT with Subsampled DIMD for Transform Set Selection", Joint Video Experts Team (JVET) of ITU-T SG 16 WP 3 and ISO/IEC JTC 1/SC 29, JVET-AJ0255-v2, 36th Meeting, Kemer, TR, Nov. 1-8, 2024, 148th MPEG Meeting, Nov. 4, 2024-Nov. 8, 2024, Kemer (Motion Picture Expert Group or ISO/IEC JTC1/SC29/WG11), No. m69812, Oct. 24, 2024, 2 Pages. XP030328376, Abstract, Sec. 1.

International Search Report and Written Opinion—PCT/US2025/019379—ISA/EPO—Jun. 11, 2025 20 Pages.

Zhao L (Bytedance)., et al., "EE2-4.1 Related: Alternative Intra Mode Derivation for LFNST/NSPT", Joint Video Experts Team (JVET) of ITU-T SG 16 WP 3 and ISO/IEC JTC 1/SC 29, 34th Meeting, Rennes, FR, Apr. 17-24, 2024, 146th MPEG Meeting, Apr. 22, 2024-Apr. 26, 2024, Rennes, Motion Picture Expert Group or ISO/IEC JTC1/SC29/WG11), No. m67312, JVET-AH0218-v2, Apr. 11, 2024, pp. 1-3, XP030316992, Abstract, Sec. 1, Sec. 2.

Bross B., et al., "Versatile Video Coding Editorial Refinements on Draft 10", JVET-T2001-v2, Joint Video Experts Team (JVET) of ITU-T SG 16 WP 3 and ISO/IEC JTC 1/SC 2920th Meeting, by Teleconference, Oct. 7-16, 2020, pp. 1-514.

Coban M., et al., "AHG12: Multiple transform set selection for intra LFNST/NSPT with subsampled DIMD for transform set selection", JVET-AJ0255-v4, Joint Video Experts Team (JVET) of ITU-T SG 16 WP 3 and ISO/IEC JTC 1/SC 29, 36th Meeting, Kemer, TR, Nov. 1-8, 2024, pp. 1-3.

Coban M., et al., "Algorithm Description of Enhanced Compression Model 12 (ECM 12)", Joint Video Experts Team (JVET) of ITU-T SG 16 WP 3 and ISO/IEC JTC 1/SC 29, 33rd Meeting, by teleconference, Jan. 17-26, 2024, JVET-AG2025, JVET-AG2025-v1, pp. 1-91.

Coban M., et al., "Algorithm description of Enhanced Compression Model 13 (ECM 13)", JVET-AH2025, Joint Video Experts Team (JVET) of ITU-T SG 16 WP 3 and ISO/IEC JTC 1/SC 29, 34th Meeting, Rennes, FR, Apr. 17-24, 2024, pp. 1-98, JVET-AH2025-v1.

Coban M., et al., "Algorithm description of Enhanced Compression Model 14 (ECM 14)", JVET-AI2025, JVET-AI2025-v1, Joint Video Experts Team (JVET) of ITU-T SG 16 WP 3 and ISO/IEC JTC 1/SC 29 35th Meeting: Sapporo, JP, Jul. 12-19, 2024, pp. 1-103.

Coban M., et al., "Algorithm description of Enhanced Compression Model 15 (ECM 15)", JVET-AJ2025, JVET-AJ2025-v1, Joint Video Experts Team (JVET) of ITU-T SG 16 WP 3 and ISO/IEC JTC 1/SC 2936th Meeting: Kemer, TR, Nov. 1-8, 2024, pp. 1-113.

Coban M., et al., "EE2-3.1: Multiple transform set selection for intra LFNST/NSPT with subsampled DIMD for transform set selection", JVET-AK0217-v2, Joint Video Experts Team (JVET) of ITU-T SG21 WP3/21 and ISO/IEC JTC 1/SC 29 37th Meeting, Geneva, CH, Jan. 14-22, 2025, pp. 1-5.

Coban M., et al., "EE2-4.1 Related: Alternative Intra Mode Derivation for LFNST/NSPT Kernel Selection", JVET-AH0237-v3, Joint Video Experts Team (JVET) of ITU-T SG 16 WP 3 and ISO/IEC JTC 1/SC 29 34th Meeting, Rennes, FR, Apr. 17-24, 2024, pp. 1-2.

Coban M., et al., "EE2-4.4e: Test 4.4a with reduced number of transform candidates", JVET-AI0219-v2, Joint Video Experts Team (JVET) of ITU-T SG 16 WP 3 and ISO/IEC JTC 1/SC 29, 35th Meeting, Sapporo, JP, Jul. 12-19, 2024, pp. 1-2.

ITU-T H.265: "Series H: Audiovisual and Multimedia Systems Infrastructure of Audiovisual Services—Coding of Moving Video", High Efficiency Video Coding, The International Telecommunication Union, Jun. 2019, 696 Pages.

ITU-T H.266: "Series H: Audiovisual and Multimedia Systems Infrastructure of Audiovisual Services—Coding of Moving Video", Versatile Video Coding, The International Telecommunication Union, Aug. 2020, 516 pages.

Karczewicz M., et al., "Common Test Conditions and Evaluation Procedures for Enhanced Compression Tool Testing", JVET-AF2017-v1, Joint Video Experts Team (JVET) of ITU-T SG 16 WP 3 and ISO/IEC JTC 1/SC 29 32nd Meeting, Hannover, DE, Oct. 13-20, 2023, pp. 1-12.

Karczewicz M., et al., "Common Test Conditions and Evaluation Procedures for Enhanced Compression Tool Testing", JVET-Y2017-v1, Joint Video Experts Team (JVET) of ITU-T SG 16 WP 3 and ISO/IEC JTC 1/SC 29, 25th Meeting, by teleconference, Jan. 12-21, 2022, pp. 1-12.

Wang F., et al., "EE plan for Multiple Transform Set Selection", JVET-AH0347-v1, Joint Video Experts Team (JVET) of ITU-T SG 16 WP 3 and ISO/IEC JTC 1/SC 29 34th Meeting, Rennes, FR, Apr. 17-24, 2024, pp. 1-3.

Wang F., et al., "EE2-4.1: Multiple Transform Set Selection for LFNST/NSPT", JVET-AH0056-v2, Joint Video Experts Team (JVET) of ITU-T SG 16 WP 3 and ISO/IEC JTC 1/SC 29 34th Meeting, Rennes, FR, Apr. 17-24, 2024, pp. 1-4.

Wang F., et al., "EE2-4.4a: Multiple Transform Set Selection for Intra LFNST/NSPT Without Complexity Reduction", JVET-AI0163-v4, Joint Video Experts Team (JVET) of ITU-T SG 16 WP 3 and ISO/IEC JTC 1/SC 29 35th Meeting, Sapporo, JP, Jul. 12-19, 2024, pp. 1-3.

Wang F., et al., "Non-EE2: Multiple Transform Set Selection for LFNST/NSPT", JVET-AG0062-v2, Joint Video Experts Team (JVET) of ITU-T SG 16 WP 3 and ISO/IEC JTC 1/SC 29 33rd Meeting, by teleconference, Jan. 17-26, 2024, pp. 1-2.

Zhao L., et al., "EE2-4.1 Related: Alternative Intra Mode Derivation for LFNST/NSPT", JVET-AH0218-v3, Joint Video Experts Team (JVET) of ITU-T SG 16 WP 3 and ISO/IEC JTC 1/SC 29 34th Meeting, Rennes, FR, Apr. 17-24, 2024, pp. 1-4.

* cited by examiner

INTRA SPATIAL GEOMETRIC PARTITION MODE AND MATRIX INTRA PARTITION MODE TRANSFORM SET SELECTION IN VIDEO CODING

This application claims the benefit of U.S. Provisional Patent Application 63/636,569, filed Apr. 19, 2024, the entire contents of which is incorporated herein by reference.

TECHNICAL FIELD

This disclosure relates to video encoding and video decoding.

BACKGROUND

Digital video capabilities can be incorporated into a wide range of devices, including digital televisions, digital direct broadcast systems, wireless broadcast systems, personal digital assistants (PDAs), laptop or desktop computers, tablet computers, e-book readers, digital cameras, digital recording devices, digital media players, video gaming devices, video game consoles, cellular or satellite radio telephones, so-called "smart phones," video teleconferencing devices, video streaming devices, and the like. Digital video devices implement video coding techniques, such as those described in the standards defined by MPEG-2, MPEG-4, ITU-T H.263, ITU-T H.264/MPEG-4, Part 10, Advanced Video Coding (AVC), ITU-T H.265/High Efficiency Video Coding (HEVC), ITU-T H.266/Versatile Video Coding (VVC), and extensions of such standards, as well as proprietary video codecs/formats such as AOMedia Video 1 (AV1) that was developed by the Alliance for Open Media. The video devices may transmit, receive, encode, decode, and/or store digital video information more efficiently by implementing such video coding techniques.

Video coding techniques include spatial (intra-picture) prediction and/or temporal (inter-picture) prediction to reduce or remove redundancy inherent in video sequences. For block-based video coding, a video slice (e.g., a video picture or a portion of a video picture) may be partitioned into video blocks, which may also be referred to as coding tree units (CTUs), coding units (CUs) and/or coding nodes. Video blocks in an intra-coded (I) slice of a picture are encoded using spatial prediction with respect to reference samples in neighboring blocks in the same picture. Video blocks in an inter-coded (P or B) slice of a picture may use spatial prediction with respect to reference samples in neighboring blocks in the same picture or temporal prediction with respect to reference samples in other reference pictures. Pictures may be referred to as frames, and reference pictures may be referred to as reference frames.

SUMMARY

In general, this disclosure describes techniques for use in video coding. More particularly, this disclosure describes techniques for deriving an additional transform set to be signaled for intra spatial geometric partitioning mode (SGPM) and/or for deriving the intra mode for a non-separable primary transform (NSPT)/low frequency non-separable secondary transforms (LFSNT) transform kernel set selection for MIP mode. The techniques of this disclosure may improve video coding efficiency and/or video coding quality.

In one example, a method includes: determining to use a spatial geometric partition mode (SGPM) for a current block of the video data; performing a Sobel-based intra prediction direction derivation for the current block; determining a first intra prediction mode of a plurality of intra prediction modes based on an output of the Sobel-based intra prediction direction derivation; determining a second intra prediction mode of the plurality of intra prediction modes based on the output of the Sobel-based intra prediction direction derivation; determining a first set of transforms based on the first intra prediction mode; determining a second set of transforms based on the second intra prediction mode; and decoding the current block based on the SGPM, and at least one of the first set of transforms or the second set of transforms.

In another example, a device includes one or more memories configured to store video data and one or more processors implemented in circuitry and in communication with the one or more memories, the one or more processors configured to: determine to use a spatial geometric partition mode (SGPM) for a current block of the video data; perform a Sobel-based intra prediction direction derivation for the current block; determine a first intra prediction mode of a plurality of intra prediction modes based on an output of the Sobel-based intra prediction direction derivation; determine a second intra prediction mode of the plurality of intra prediction modes based on the output of the Sobel-based intra prediction direction derivation; determine a first set of transforms based on the first intra prediction mode; determine a second set of transforms based on the second intra prediction mode; and decode the current block based on the SGPM, and at least one of the first set of transforms or the second set of transforms.

In another example, a method includes: determining to use a spatial geometric partition mode (SGPM) for a current block of the video data; performing a Sobel-based intra prediction direction derivation for the current block; determining a first intra prediction mode of a plurality of intra prediction modes based on an output of the Sobel-based intra prediction direction derivation; determining a second intra prediction mode of the plurality of intra prediction modes based on the output of the Sobel-based intra prediction direction derivation; determining a first set of transforms based on the first intra prediction mode; determining a second set of transforms based on the second intra prediction mode; and encoding the current block based on the SGPM, and at least one of the first set of transforms or the second set of transforms.

The details of one or more examples are set forth in the accompanying drawings and the description below. Other features, objects, and advantages will be apparent from the description, drawings, and claims.

DETAILED DESCRIPTION

In general, this disclosure describes techniques for video coding. More particularly, this disclosure described techniques for deriving an additional transform set to be signaled for intra SGPM and/or for deriving the intra mode for NSPT/LFSNT transform kernel set selection for MIP mode. The techniques of this disclosure may improve video coding efficiency and/or video coding quality.

Figure 1:
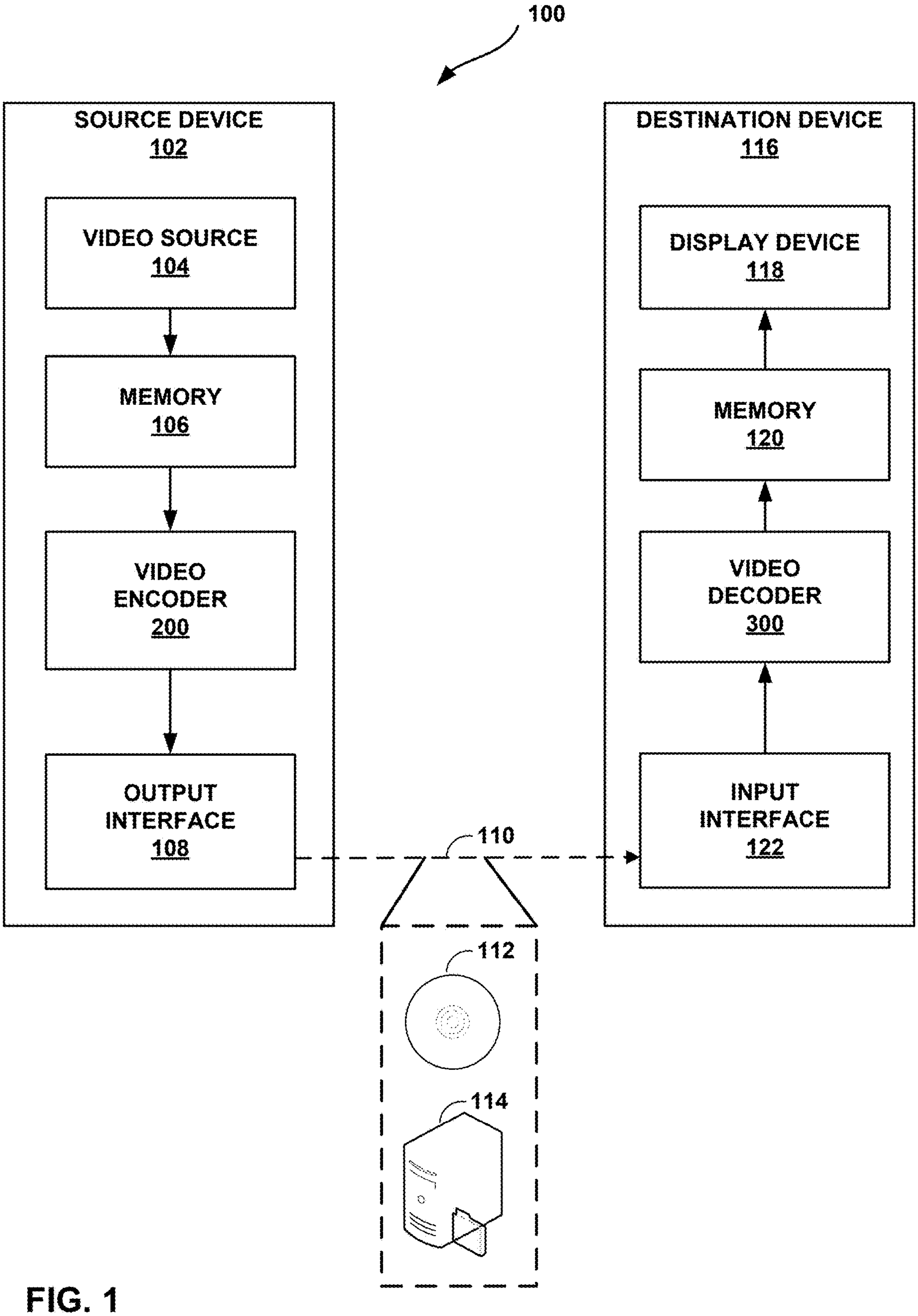
FIG. 1 is a block diagram illustrating an example video encoding and decoding system that may perform the techniques of this disclosure.

FIG. 1 is a block diagram illustrating an example video encoding and decoding system 100 that may perform the techniques of this disclosure. The techniques of this disclosure are generally directed to coding (encoding and/or decoding) video data. In general, video data includes any data for processing a video. Thus, video data may include raw, unencoded video, encoded video, decoded (e.g., reconstructed) video, and video metadata, such as signaling data.

As shown in FIG. 1, system 100 includes a source device 102 that provides encoded video data to be decoded and displayed by a destination device 116, in this example. In particular, source device 102 provides the video data to destination device 116 via a computer-readable medium 110. Source device 102 and destination device 116 may be or include any of a wide range of devices, such as desktop computers, notebook (i.e., laptop) computers, mobile devices, tablet computers, set-top boxes, telephone handsets such as smartphones, televisions, cameras, display devices, digital media players, video gaming consoles, video streaming device, broadcast receiver devices, or the like. In some cases, source device 102 and destination device 116 may be equipped for wireless communication, and thus may be referred to as wireless communication devices.

In the example of FIG. 1, source device 102 includes video source 104, memory 106, video encoder 200, and output interface 108. Destination device 116 includes input interface 122, video decoder 300, memory 120, and display device 118. In accordance with this disclosure, video encoder 200 of source device 102 and video decoder 300 of destination device 116 may be configured to apply the techniques for SGPM and/or MIP mode. Thus, source device 102 represents an example of a video encoding device, while destination device 116 represents an example of a video decoding device. In other examples, a source device and a destination device may include other components or arrangements. For example, source device 102 may receive video data from an external video source, such as an external camera. Likewise, destination device 116 may interface with an external display device, rather than include an integrated display device.

System 100 as shown in FIG. 1 is merely one example. In general, any digital video encoding and/or decoding device may perform techniques for SGPM and/or MIP mode. Source device 102 and destination device 116 are merely examples of such coding devices in which source device 102 generates coded video data for transmission to destination device 116. This disclosure refers to a "coding" device as a device that performs coding (encoding and/or decoding) of data. Thus, video encoder 200 and video decoder 300 represent examples of coding devices, in particular, a video encoder and a video decoder, respectively. In some examples, source device 102 and destination device 116 may operate in a substantially symmetrical manner such that each of source device 102 and destination device 116 includes video encoding and decoding components. Hence, system 100 may support one-way or two-way video transmission between source device 102 and destination device 116, e.g., for video streaming, video playback, video broadcasting, or video telephony.

In general, video source 104 represents a source of video data (i.e., raw, unencoded video data) and provides a sequential series of pictures (also referred to as "frames") of the video data to video encoder 200, which encodes data for the pictures. Video source 104 of source device 102 may include a video capture device, such as a video camera, a video archive containing previously captured raw video, and/or a video feed interface to receive video from a video content provider. As a further alternative, video source 104 may generate computer graphics-based data as the source video, or a combination of live video, archived video, and computer-generated video. In each case, video encoder 200 encodes the captured, pre-captured, or computer-generated video data. Video encoder 200 may rearrange the pictures from the received order (sometimes referred to as "display order") into a coding order for coding. Video encoder 200 may generate a bitstream including encoded video data. Source device 102 may then output the encoded video data via output interface 108 onto computer-readable medium 110 for reception and/or retrieval by, e.g., input interface 122 of destination device 116.

Memory 106 of source device 102 and memory 120 of destination device 116 represent general purpose memories. In some examples, memories 106, 120 may store raw video data, e.g., raw video from video source 104 and raw, decoded video data from video decoder 300. Additionally or alternatively, memories 106, 120 may store software instructions executable by, e.g., video encoder 200 and video decoder 300, respectively.

Although memory 106 and memory 120 are shown separately from video encoder 200 and video decoder 300 in this example, it should be understood that video encoder 200 and video decoder 300 may also include internal memories for functionally similar or equivalent purposes. Furthermore, memories 106, 120 may store encoded video data, e.g., output from video encoder 200 and input to video decoder 300. In some examples, portions of memories 106, 120 may be allocated as one or more video buffers, e.g., to store raw, decoded, and/or encoded video data.

Computer-readable medium 110 may represent any type of medium or device capable of transporting the encoded video data from source device 102 to destination device 116. In one example, computer-readable medium 110 represents a communication medium to enable source device 102 to transmit encoded video data directly to destination device 116 in real-time, e.g., via a radio frequency network or computer-based network. Output interface 108 may modulate a transmission signal including the encoded video data, and input interface 122 may demodulate the received transmission signal, according to a communication standard, such as a wireless communication protocol. The communication medium may include any wireless or wired communication medium, such as a radio frequency (RF) spectrum or one or more physical transmission lines. The communication medium may form part of a packet-based network, such as a local area network, a wide-area network, or a global network such as the Internet. The communication medium may include routers, switches, base stations, or any other equipment that may be useful to facilitate communication from source device 102 to destination device 116.

In some examples, source device 102 may output encoded data from output interface 108 to storage device 112. Similarly, destination device 116 may access encoded data from storage device 112 via input interface 122. Storage device 112 may include any of a variety of distributed or locally accessed data storage media such as a hard drive, Blu-ray discs, DVDs, CD-ROMs, flash memory, volatile or non-volatile memory, or any other suitable digital storage media for storing encoded video data.

In some examples, source device 102 may output encoded video data to file server 114 or another intermediate storage device that may store the encoded video data generated by source device 102. Destination device 116 may access stored video data from file server 114 via streaming or download.

File server 114 may be any type of server device capable of storing encoded video data and transmitting that encoded video data to the destination device 116. File server 114 may represent a web server (e.g., for a website), a server configured to provide a file transfer protocol service (such as File Transfer Protocol (FTP) or File Delivery over Unidirectional Transport (FLUTE) protocol), a content delivery network (CDN) device, a hypertext transfer protocol (HTTP) server, a Multimedia Broadcast Multicast Service (MBMS) or Enhanced MBMS (eMBMS) server, and/or a network attached storage (NAS) device. File server 114 may, additionally or alternatively, implement one or more HTTP streaming protocols, such as Dynamic Adaptive Streaming over HTTP (DASH), HTTP Live Streaming (HLS), Real Time Streaming Protocol (RTSP), HTTP Dynamic Streaming, or the like.

Destination device 116 may access encoded video data from file server 114 through any standard data connection, including an Internet connection. This may include a wireless channel (e.g., a Wi-Fi connection), a wired connection (e.g., digital subscriber line (DSL), cable modem, etc.), or a combination of both that is suitable for accessing encoded video data stored on file server 114. Input interface 122 may be configured to operate according to any one or more of the various protocols discussed above for retrieving or receiving media data from file server 114, or other such protocols for retrieving media data.

Output interface 108 and input interface 122 may represent wireless transmitters/receivers, modems, wired networking components (e.g., Ethernet cards), wireless communication components that operate according to any of a variety of IEEE 802.11 standards, or other physical components. In examples where output interface 108 and input interface 122 include wireless components, output interface 108 and input interface 122 may be configured to transfer data, such as encoded video data, according to a cellular communication standard, such as 4G, 4G-LTE (Long-Term Evolution), LTE Advanced, 5G, or the like. In some examples where output interface 108 includes a wireless transmitter, output interface 108 and input interface 122 may be configured to transfer data, such as encoded video data, according to other wireless standards, such as an IEEE 802.11 specification, an IEEE 802.15 specification (e.g., ZigBee™), a Bluetooth™ standard, or the like. In some examples, source device 102 and/or destination device 116 may include respective system-on-a-chip (SoC) devices. For example, source device 102 may include an SoC device to perform the functionality attributed to video encoder 200 and/or output interface 108, and destination device 116 may include an SoC device to perform the functionality attributed to video decoder 300 and/or input interface 122.

The techniques of this disclosure may be applied to video coding in support of any of a variety of multimedia applications, such as over-the-air television broadcasts, cable television transmissions, satellite television transmissions, Internet streaming video transmissions, such as dynamic adaptive streaming over HTTP (DASH), digital video that is encoded onto a data storage medium, decoding of digital video stored on a data storage medium, or other applications.

Input interface 122 of destination device 116 receives an encoded video bitstream from computer-readable medium 110 (e.g., a communication medium, storage device 112, file server 114, or the like). The encoded video bitstream may include signaling information defined by video encoder 200, which is also used by video decoder 300, such as syntax elements having values that describe characteristics and/or processing of video blocks or other coded units (e.g., slices, pictures, groups of pictures, sequences, or the like). Display device 118 displays decoded pictures of the decoded video data to a user. Display device 118 may represent any of a variety of display devices such as a liquid crystal display (LCD), a plasma display, an organic light emitting diode (OLED) display, or another type of display device.

Although not shown in FIG. 1, in some examples, video encoder 200 and video decoder 300 may each be integrated with an audio encoder and/or audio decoder (e.g., audio codec), and may include appropriate MUX-DEMUX units, or other hardware and/or software, to handle multiplexed streams including both audio and video in a common data stream. Example audio codecs may include AAC, AC-3, AC-4, ALAC, ALS, AMBE, AMR, AMR-WB (G.722.2), AMR-WB+, aptx (various versions), ATRAC, BroadVoice (BV16, BV32), CELT, Enhanced AC-3 (E-AC-3), EVS, FLAC, G.711, G.722, G.722.1, G.722.2 (AMR-WB). G.723.1, G.726, G.728, G.729, G.729.1, GSM-FR, HE-AAC, ILBC, iSAC, LA Lyra, Monkey's Audio, MP1, MP2 (MPEG-1, 2 Audio Layer II), MP3, Musepack, Nellymoser Asao, OptimFROG, Opus, Sac, Satin, SBC, SILK, Siren 7, Speex, SVOPC, True Audio (TTA), TwinVQ, USAC, Vorbis (Ogg), WavPack, and Windows Media Aud.

Video encoder 200 and video decoder 300 each may be implemented as any of a variety of suitable encoder and/or decoder circuitry that includes a processing system, such as one or more microprocessors, digital signal processors (DSPs), application specific integrated circuits (ASICs), field programmable gate arrays (FPGAs), discrete logic, software, hardware, firmware or any combinations thereof. When the techniques are implemented partially in software, a device may store instructions for the software in a suitable, non-transitory computer-readable medium and execute the instructions in hardware using one or more processors to perform the techniques of this disclosure. Each of video encoder 200 and video decoder 300 may be included in one or more encoders or decoders, either of which may be integrated as part of a combined encoder/decoder (CODEC) in a respective device. A device including video encoder 200 and/or video decoder 300 may implement video encoder 200 and/or video decoder 300 in processing circuitry such as an integrated circuit and/or a microprocessor. Such a device may be a wireless communication device, such as a cellular telephone, or any other type of device described herein.

Video encoder 200 and video decoder 300 may operate according to a video coding standard, such as ITU-T H.265, also referred to as High Efficiency Video Coding (HEVC) or extensions thereto, such as the multi-view and/or scalable video coding extensions. Alternatively, video encoder 200 and video decoder 300 may operate according to other proprietary or industry standards, such as ITU-T H.266, also referred to as Versatile Video Coding (VVC). In other examples, video encoder 200 and video decoder 300 may operate according to a proprietary video codec/format, such as AOMedia Video 1 (AV1), extensions of AV1, and/or successor versions of AV1 (e.g., AV2). In other examples, video encoder 200 and video decoder 300 may operate according to other proprietary formats or industry standards. The techniques of this disclosure, however, are not limited to any particular coding standard or format. In general, video encoder 200 and video decoder 300 may be configured to perform the techniques of this disclosure in conjunction with any video coding techniques that use SGPM and/or MIP mode.

In general, video encoder 200 and video decoder 300 may perform block-based coding of pictures. The term "block" generally refers to a structure including data to be processed (e.g., encoded, decoded, or otherwise used in the encoding and/or decoding process). For example, a block may include a two-dimensional matrix of samples of luminance and/or chrominance data. In general, video encoder 200 and video decoder 300 may code video data represented in a YUV (e.g., Y, Cb, Cr) format. That is, rather than coding red, green, and blue (RGB) data for samples of a picture, video encoder 200 and video decoder 300 may code luminance and chrominance components, where the chrominance components may include both red hue and blue hue chrominance components. In some examples, video encoder 200 converts received RGB formatted data to a YUV representation prior to encoding, and video decoder 300 converts the YUV representation to the RGB format. Alternatively, pre- and post-processing units (not shown) may perform these conversions.

This disclosure may generally refer to coding (e.g., encoding and decoding) of pictures to include the process of encoding or decoding data of the picture. Similarly, this disclosure may refer to coding of blocks of a picture to include the process of encoding or decoding data for the blocks, e.g., prediction and/or residual coding. An encoded video bitstream generally includes a series of values for syntax elements representative of coding decisions (e.g., coding modes) and partitioning of pictures into blocks. Thus, references to coding a picture or a block should generally be understood as coding values for syntax elements forming the picture or block.

HEVC defines various blocks, including coding units (CUs), prediction units (PUs), and transform units (TUs). According to HEVC, a video coder (such as video encoder 200) partitions a coding tree unit (CTU) into CUs according to a quadtree structure. That is, the video coder partitions CTUs and CUs into four equal, non-overlapping squares, and each node of the quadtree has either zero or four child nodes. Nodes without child nodes may be referred to as "leaf nodes," and CUs of such leaf nodes may include one or more PUs and/or one or more TUs. The video coder may further partition PUs and TUs. For example, in HEVC, a residual quadtree (RQT) represents partitioning of TUs. In HEVC, PUs represent inter-prediction data, while TUs represent residual data. CUs that are intra-predicted include intra-prediction information, such as an intra-mode indication.

As another example, video encoder 200 and video decoder 300 may be configured to operate according to VVC. According to VVC, a video coder (such as video encoder 200) partitions a picture into a plurality of CTUs. Video encoder 200 may partition a CTU according to a tree structure, such as a quadtree-binary tree (QTBT) structure or Multi-Type Tree (MTT) structure. The QTBT structure removes the concepts of multiple partition types, such as the separation between CUs, PUs, and TUs of HEVC. A QTBT structure includes two levels: a first level partitioned according to quadtree partitioning, and a second level partitioned according to binary tree partitioning. A root node of the QTBT structure corresponds to a CTU. Leaf nodes of the binary trees correspond to CUs.

In an MTT partitioning structure, blocks may be partitioned using a quadtree (QT) partition, a binary tree (BT) partition, and one or more types of triple tree (TT) (also called ternary tree (TT)) partitions. A triple or ternary tree partition is a partition where a block is split into three sub-blocks. In some examples, a triple or ternary tree partition divides a block into three sub-blocks without dividing the original block through the center. The partitioning types in MTT (e.g., QT, BT, and TT), may be symmetrical or asymmetrical.

When operating according to the AV1 codec, video encoder 200 and video decoder 300 may be configured to code video data in blocks. In AV1, the largest coding block that can be processed is called a superblock. In AV1, a superblock can be either 128×128 luma samples or 64×64 luma samples. However, in successor video coding formats (e.g., AV2), a superblock may be defined by different (e.g., larger) luma sample sizes. In some examples, a superblock is the top level of a block quadtree. Video encoder 200 may further partition a superblock into smaller coding blocks. Video encoder 200 may partition a superblock and other coding blocks into smaller blocks using square or non-square partitioning. Non-square blocks may include N/2×N, N×N/2, N/4×N, and N×N/4 blocks. Video encoder 200 and video decoder 300 may perform separate prediction and transform processes on each of the coding blocks.

AV1 also defines a tile of video data. A tile is a rectangular array of superblocks that may be coded independently of other tiles. That is, video encoder 200 and video decoder 300 may encode and decode, respectively, coding blocks within a tile without using video data from other tiles. However, video encoder 200 and video decoder 300 may perform filtering across tile boundaries. Tiles may be uniform or non-uniform in size. Tile-based coding may enable parallel processing and/or multi-threading for encoder and decoder implementations.

In some examples, video encoder 200 and video decoder 300 may use a single QTBT or MTT structure to represent each of the luminance and chrominance components, while in other examples, video encoder 200 and video decoder 300 may use two or more QTBT or MTT structures, such as one QTBT/MTT structure for the luminance component and another QTBT/MTT structure for both chrominance components (or two QTBT/MTT structures for respective chrominance components).

Video encoder 200 and video decoder 300 may be configured to use quadtree partitioning, QTBT partitioning, MTT partitioning, superblock partitioning, or other partitioning structures.

In some examples, a CTU includes a coding tree block (CTB) of luma samples, two corresponding CTBs of chroma samples of a picture that has three sample arrays, or a CTB of samples of a monochrome picture or a picture that is coded using three separate color planes and syntax structures used to code the samples. A CTB may be an N×N block of samples for some value of N such that the division of a component into CTBs is a partitioning. A component is an array or single sample from one of the three arrays (luma and two chroma) that compose a picture in 4:2:0, 4:2:2, or 4:4:4 color format or the array or a single sample of the array that compose a picture in monochrome format. In some examples, a coding block is an M×N block of samples for some values of M and N such that a division of a CTB into coding blocks is a partitioning.

The blocks (e.g., CTUs or CUs) may be grouped in various ways in a picture. As one example, a brick may refer to a rectangular region of CTU rows within a particular tile in a picture. A tile may be a rectangular region of CTUs within a particular tile column and a particular tile row in a picture. A tile column refers to a rectangular region of CTUs having a height equal to the height of the picture and a width specified by syntax elements (e.g., such as in a picture parameter set). A tile row refers to a rectangular region of CTUs having a height specified by syntax elements (e.g., such as in a picture parameter set) and a width equal to the width of the picture.

In some examples, a tile may be partitioned into multiple bricks, each of which may include one or more CTU rows within the tile. A tile that is not partitioned into multiple bricks may also be referred to as a brick. However, a brick that is a true subset of a tile may not be referred to as a tile. The bricks in a picture may also be arranged in a slice. A slice may be an integer number of bricks of a picture that may be exclusively contained in a single network abstraction layer (NAL) unit. In some examples, a slice includes either a number of complete tiles or only a consecutive sequence of complete bricks of one tile.

This disclosure may use "N×N" and "N by N" interchangeably to refer to the sample dimensions of a block (such as a CU or other video block) in terms of vertical and horizontal dimensions, e.g., 16×16 samples or 16 by 16 samples. In general, a 16×16 CU will have 16 samples in a vertical direction (y=16) and 16 samples in a horizontal direction (x=16). Likewise, an N×N CU generally has N samples in a vertical direction and N samples in a horizontal direction, where N represents a nonnegative integer value. The samples in a CU may be arranged in rows and columns. Moreover, CUs need not necessarily have the same number of samples in the horizontal direction as in the vertical direction. For example, CUs may include N×M samples, where M is not necessarily equal to N.

Video encoder 200 encodes video data for CUs representing prediction and/or residual information, and other information. The prediction information indicates how the CU is to be predicted in order to form a prediction block for the CU. The residual information generally represents sample-by-sample differences between samples of the CU prior to encoding and the prediction block.

To predict a CU, video encoder 200 may generally form a prediction block for the CU through inter-prediction or intra-prediction. Inter-prediction generally refers to predicting the CU from data of a previously coded picture, whereas intra-prediction generally refers to predicting the CU from previously coded data of the same picture. To perform inter-prediction, video encoder 200 may generate the prediction block using one or more motion vectors. Video encoder 200 may generally perform a motion search to identify a reference block that closely matches the CU, e.g., in terms of differences between the CU and the reference block. Video encoder 200 may calculate a difference metric using a sum of absolute difference (SAD), sum of squared differences (SSD), mean absolute difference (MAD), mean squared differences (MSD), or other such difference calculations to determine whether a reference block closely matches the current CU. In some examples, video encoder 200 may predict the current CU using uni-directional prediction or bi-directional prediction.

Some examples of VVC also provide an affine motion compensation mode, which may be considered an inter-prediction mode. In affine motion compensation mode, video encoder 200 may determine two or more motion vectors that represent non-translational motion, such as zoom in or out, rotation, perspective motion, or other irregular motion types.

To perform intra-prediction, video encoder 200 may select an intra-prediction mode to generate the prediction block. Some examples of VVC provide sixty-seven intra-prediction modes, including various directional modes, as well as planar mode and DC mode. In general, video encoder 200 selects an intra-prediction mode that describes neighboring samples to a current block (e.g., a block of a CU) from which to predict samples of the current block. Such samples may generally be above, above and to the left, or to the left of the current block in the same picture as the current block, assuming video encoder 200 codes CTUs and CUs in raster scan order (left to right, top to bottom).

Video encoder 200 encodes data representing the prediction mode for a current block. For example, for inter-prediction modes, video encoder 200 may encode data representing which of the various available inter-prediction modes is used, as well as motion information for the corresponding mode. For uni-directional or bi-directional inter-prediction, for example, video encoder 200 may encode motion vectors using advanced motion vector prediction (AMVP) or merge mode. Video encoder 200 may use similar modes to encode motion vectors for affine motion compensation mode.

AV1 includes two general techniques for encoding and decoding a coding block of video data. The two general techniques are intra prediction (e.g., intra frame prediction or spatial prediction) and inter prediction (e.g., inter frame prediction or temporal prediction). In the context of AV1, when predicting blocks of a current frame of video data using an intra prediction mode, video encoder 200 and video decoder 300 do not use video data from other frames of video data. For most intra prediction modes, video encoder 200 encodes blocks of a current frame based on the difference between sample values in the current block and predicted values generated from reference samples in the same frame. Video encoder 200 determines predicted values generated from the reference samples based on the intra prediction mode.

Following prediction, such as intra-prediction or inter-prediction of a block, video encoder 200 may calculate residual data for the block. The residual data, such as a residual block, represents sample by sample differences between the block and a prediction block for the block, formed using the corresponding prediction mode. Video encoder 200 may apply one or more transforms to the residual block, to produce transformed data in a transform domain instead of the sample domain. For example, video encoder 200 may apply a discrete cosine transform (DCT), an integer transform, a wavelet transform, or a conceptually similar transform to residual video data. Additionally, video encoder 200 may apply a secondary transform following the first transform, such as a mode-dependent non-separable secondary transform (MDNSST), a signal dependent transform, a Karhunen-Loeve transform (KLT), or the like. Video encoder 200 produces transform coefficients following application of the one or more transforms.

As noted above, following any transforms to produce transform coefficients, video encoder 200 may perform quantization of the transform coefficients. Quantization generally refers to a process in which transform coefficients are quantized to possibly reduce the amount of data used to represent the transform coefficients, providing further compression. By performing the quantization process, video encoder 200 may reduce the bit depth associated with some or all of the transform coefficients. For example, video encoder 200 may round an n-bit value down to an m-bit value during quantization, where n is greater than m. In some examples, to perform quantization, video encoder 200 may perform a bitwise right-shift of the value to be quantized.

Following quantization, video encoder 200 may scan the transform coefficients, producing a one-dimensional vector from the two-dimensional matrix including the quantized transform coefficients. The scan may be designed to place higher energy (and therefore lower frequency) transform coefficients at the front of the vector and to place lower energy (and therefore higher frequency) transform coefficients at the back of the vector. In some examples, video encoder 200 may utilize a predefined scan order to scan the quantized transform coefficients to produce a serialized vector, and then entropy encode the quantized transform coefficients of the vector. In other examples, video encoder 200 may perform an adaptive scan. After scanning the quantized transform coefficients to form the one-dimensional vector, video encoder 200 may entropy encode the one-dimensional vector, e.g., according to context-adaptive binary arithmetic coding (CABAC). Video encoder 200 may also entropy encode values for syntax elements describing metadata associated with the encoded video data for use by video decoder 300 in decoding the video data.

To perform CABAC, video encoder 200 may assign a context within a context model to a symbol to be transmitted. The context may relate to, for example, whether neighboring values of the symbol are zero-valued or not. The probability determination may be based on a context assigned to the symbol.

Video encoder 200 may further generate syntax data, such as block-based syntax data, picture-based syntax data, and sequence-based syntax data, to video decoder 300, e.g., in a picture header, a block header, a slice header, or other syntax data, such as a sequence parameter set (SPS), picture parameter set (PPS), or video parameter set (VPS). Video decoder 300 may likewise decode such syntax data to determine how to decode corresponding video data.

In this manner, video encoder 200 may generate a bitstream including encoded video data, e.g., syntax elements describing partitioning of a picture into blocks (e.g., CUs) and prediction and/or residual information for the blocks. Ultimately, video decoder 300 may receive the bitstream and decode the encoded video data.

In general, video decoder 300 performs a reciprocal process to that performed by video encoder 200 to decode the encoded video data of the bitstream. For example, video decoder 300 may decode values for syntax elements of the bitstream using CABAC in a manner substantially similar to, albeit reciprocal to, the CABAC encoding process of video encoder 200. The syntax elements may define partitioning information for partitioning of a picture into CTUs, and partitioning of each CTU according to a corresponding partition structure, such as a QTBT structure, to define CUs of the CTU. The syntax elements may further define prediction and residual information for blocks (e.g., CUs) of video data.

The residual information may be represented by, for example, quantized transform coefficients. Video decoder 300 may inverse quantize and inverse transform the quantized transform coefficients of a block to reproduce a residual block for the block. Video decoder 300 uses a signaled prediction mode (intra- or inter-prediction) and related prediction information (e.g., motion information for inter-prediction) to form a prediction block for the block. Video decoder 300 may then combine the prediction block and the residual block (on a sample-by-sample basis) to reproduce the original block. Video decoder 300 may perform additional processing, such as performing a deblocking process to reduce visual artifacts along boundaries of the block.

This disclosure may generally refer to "signaling" certain information, such as syntax elements. The term "signaling" may generally refer to the communication of values for syntax elements and/or other data used to decode encoded video data. That is, video encoder 200 may signal values for syntax elements in the bitstream. In general, signaling refers to generating a value in the bitstream. As noted above, source device 102 may transport the bitstream to destination device 116 substantially in real time, or not in real time, such as might occur when storing syntax elements to storage device 112 for later retrieval by destination device 116.

In accordance with the techniques of this disclosure, a method of coding video data includes: determining to use a spatial geometric partition mode (SGPM) for a current block of the video data; performing a Sobel-based intra prediction direction derivation for the current block; determining a first intra prediction mode of a plurality of intra prediction modes based on an output of the Sobel-based intra prediction direction derivation; determining a second intra prediction mode of the plurality of intra prediction modes based on the output of the Sobel-based intra prediction direction derivation; determining a first set of transforms based on the first intra prediction mode; determining a second set of transforms based on the second intra prediction mode; and decoding the current block based on the SGPM, and at least one of the first set of transforms or the second set of transforms.

Video coding standards include ITU-T H.261, ISO/IEC MPEG-1 Visual, ITU-T H.262 or ISO/IEC MPEG-2 Visual, ITU-T H.263, ISO/IEC MPEG-4 Visual, ITU-T H.264 (also known as ISO/IEC MPEG-4 AVC), including its Scalable Video Coding (SVC) and Multiview Video Coding (MVC) extensions, ITU-T H.265 (also known as ISO/IEC MPEG-4 HEVC) with its extensions and ITU-TU H.266 (VVC).

In VVC and ECM. a video coder (e.g., video encoder 200 or video decoder 300) may, for intra coded blocks, use a non-separable primary transform (NSPT) for certain block sizes and low frequency non-separable secondary transforms (LFNSTs). Transform sets are determined by intra prediction modes that are mapped to 35 transform sets via a lookup table. For example, video encoder 200 may determine a transform set based on the intra prediction mode video encoder 200 is using by looking up the intra prediction mode in the lookup table. Within each transform set, there may be 3 different non-separable transforms to choose from for a block shape. The index of the chosen transform is signaled for transform blocks that have non-zero coefficients, besides a DC coefficient, and where the last non-zero coefficient position (signaled by coefficient last position coding) within the transform block does not lie in the region where non-separable transforms have normative zeroed out coefficients. For example, video encoder 200 may signal the index in a bitstream to video decoder 300. Video decoder 300 may parse the index from the bitstream to determine a value of the index corresponding to the chosen transform.

For non-directional intra prediction modes, such as matrix intra prediction (MIP), extrapolation filter-based intra prediction mode (EIP), and intra template matching (ITMP), in order to utilize non-separable transforms more effectively, an intra prediction direction has to be derived. In Enhanced Compression Mode (ECM), for these modes, a decoder-side intra mode derivation (DIMD) technique may be used on the prediction samples to select an intra prediction mode. For example, for blocks coded using MIP, EIP, and/or ITMP, video decoder 300 may derive an intra prediction mode using a DIMD technique. In DIMD, gradients over the prediction block may be computed by a Sobel operator, and a histogram of gradient directions may be computed. The highest-ranking direction may be chosen as the intra mode direction to be used in derivation of non-separable transform set. For example, video decoder 300 may use the derived intra mode direction to select which of the 35 transform sets to use by looking up the derived intra mode in the lookup table.

In some examples, to perform DIMD for a current block, video decoder 300 may perform gradient calculation to derive one or more possible modes (e.g., M1 and M2). Details of an example DIMD workflow are as follows:

Video decoder 300 may perform gradient calculation of reconstructed samples of neighboring blocks. To derive the intra prediction mode for a block, video decoder 300 may select a set of neighboring pixels from neighboring reconstructed luma samples. Video decoder 300 may then apply a gradient calculation to the center pixel of every 3×3 window formed by the set of neighboring pixels. Note that if a neighboring pixel is not reconstructed, its gradient values may not be calculated.

Video decoder 300 may perform the gradient calculation using Sobel filters (denoted as "Mx", "My"). Video decoder 300 may perform a dot product between these 2 filters for each 3×3 window (denoted as "W") to derive horizontal and vertical gradients (denoted as "Gx", "Gy") respectively. The following may be examples of such filters:

$$M_x = \begin{bmatrix} -1 & 0 & 1 \\ -2 & 0 & 2 \\ -1 & 0 & 1 \end{bmatrix} \text{ and}$$

$$M_y = \begin{bmatrix} -1 & -2 & -1 \\ 0 & 0 & 0 \\ 1 & 2 & 1 \end{bmatrix}$$

$$Gx = \text{Mx} * W \text{ and } Gy = My * W.$$

Video decoder 300 may map gradient values to a direction. For instance, video decoder 300 may derive the intensity (G) and the orientation (O) for each window using Gx and Gy:

$$G = |G_x| + |G_y| \text{ and } O = \text{atan}\left(\frac{G_y}{G_x}\right)$$

In some examples, to reduce the computational cost of the operation arctangent ("atan"), the orientation may be represented by an index value (in range of 2 to 66) using a mapping table "atan", and it may be estimated by comparing the mapping table and Gy/Gx; if $G_y/G_x$ falls into the range of (atan [i], atan [i+1]), the orientation is assigned value "i" which may be associated with a particular prediction direction. Further information on DIMD and Sobel based derivation of intra prediction mode derivation may be found in U.S. Pat. No. 11,671,589, entitled DECODER SIDE INTRA MODE DERIVATION FOR MOST PROBABLE MODE LIST CONSTRUCTION IN VIDEO CODING, and issued on Jun. 6, 2023 and in U.S. Pat. No. 12,069,246, entitled DECODER SIDE INTRA MODE DERIVATION FOR MOST PROBABLE MODE LIST CONSTRUCTION IN VIDEO CODING, and issued on issued on Aug. 20, 2024, the entire content of both of which are incorporated by reference.

JVET-AG0062 (Non-EE2: Multiple Transform Set Selection for LFNST/NSPT, available at jvet-experts.org/doc_end_user/documents/33_Teleconference/wg11/JVET-AG0062-v3.zip) proposed to add a second set of transforms for non-directional intra modes (DIMD, template-based intra mode derivation (TIMD), MIP, EIP, ITMP, and spatial geometric partition mode (SGPM)).

According to the techniques of this disclosure, the first and second intra mode used for selection of NSPT/LFNST transform kernel sets are derived by a DIMD process that utilizes a Sobel filter to construct Histogram of Gradients (HoG). The highest amplitude HoG corresponding intra mode is assigned to the first set, and the second highest is assigned to the secondary transform kernel set selection.

For example, for SGPM blocks, video encoder 200 or video decoder 300 may use the first and second highest ranking intra mode that is derived by Sobel-based intra prediction direction derivation used in a DIMD process applied to the prediction block samples. Basically, a highest HoG (histogram of gradients) derived from a DIMD Sobel-based derivation of intra mode direction may be assigned as the intra mode for the first set of NSPT/LFSNT transforms to be used, and second highest occurring intra prediction mode in the Sobel based histogram of intra mode directions in DIMD process in ECM is used for the second transform set selection (e.g., a second set of NSPT/LFSNT transforms). This technique may replace the scheme for SGPM blocks which use intra modes derived from the split direction of SGPM mode.

In some examples, the signaling of second set of transforms follows that of what is described in JVET-AG0062.

MIP mode transform kernel selection is now described. In ECM-12.0, MIP mode's intra mode for derivation of NSPT/LFNST transform set selection is performed by applying Sobel-based DIMD process on the down sampled prediction block. According to the techniques of this disclosure, video encoder 200 or video decoder 300 may apply a Sobel-based DIMD process on the up sampled (e.g., prediction block size) prediction samples to derive the intra mode for NSPT/LFSNT transform kernel set selection.

Figure 2:
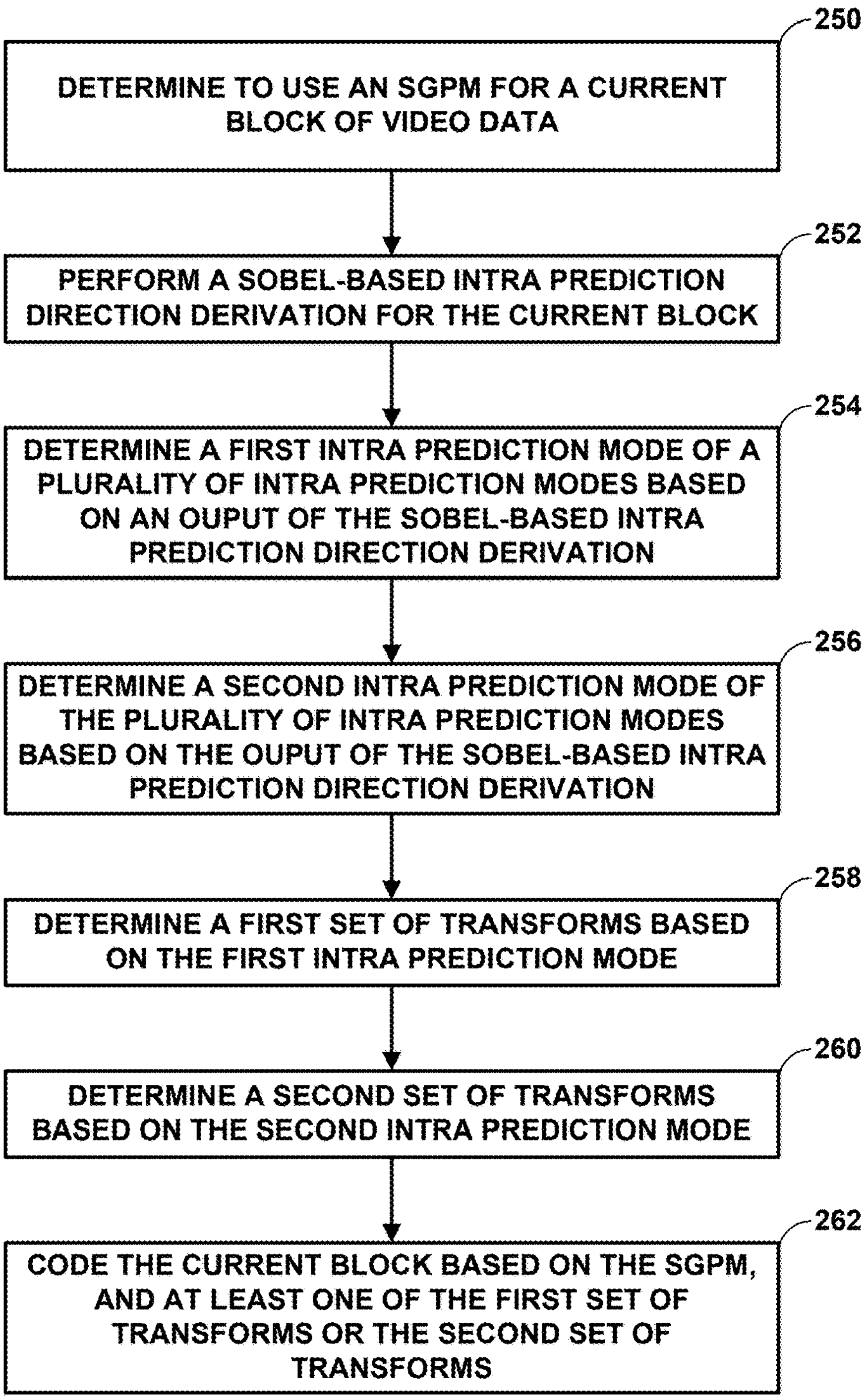
FIG. 2 is a flow chart illustrating example transform set selection techniques for spatial geometric partitioning mode (SGPM) according to one or more aspects of this disclosure.

FIG. 2 is a flow chart illustrating example transform set selection techniques for spatial geometric partitioning mode (SGPM) according to one or more aspects of this disclosure. While the techniques are described with respect to video decoder 300, such techniques may be performed by other devices, such as video encoder 200 (e.g., for encoding and/or decoding) or any other device capable of doing so.

Video decoder 300 may determine to use a spatial geometric partition mode (SGPM) for a current block of video data (250). For example, video encoder 200 may determine that using SGPM is the most accurate and/or efficient way to encode the current block. Video encoder 200 may signal a syntax element in the bitstream indicative of the use of SGPM for the current block. Video decoder 300 may obtain, from a bitstream a syntax element indicative of the use of SGPM for the current block and may parse the syntax element to determine a value of the syntax element that indicates that SGPM was used to encode the current block.

Video decoder 300 may perform a Sobel-based intra prediction direction derivation for the current block (252). For example, video decoder 300 may apply a DIMD process as part of performing the Sobel-based intra prediction direction derivation to derive a first intra prediction mode and a second intra prediction mode. The first intra prediction mode may be associated with a first direction and the second intra prediction mode may be associated with a second direction.

Video decoder 300 may determine a first intra prediction mode of a plurality of intra prediction modes based on an output of the Sobel-based intra prediction direction derivation (254). For example, video decoder 300 may determine a highest HoG derived from the Sobel-based intra prediction direction derivation to be the first intra prediction mode Video decoder 300 may determine a second intra prediction mode of the plurality of intra prediction modes based on the output of the Sobel-based intra prediction direction derivation (256). For example, video decoder 300 may determine a second highest HoG derived from the Sobel-based intra prediction direction derivation to be the second intra prediction mode.

Video decoder 300 may determine a first set of transforms based on the first intra prediction mode (258). For example, video decoder 300 may look up the first intra prediction mode in a lookup table to determine the first set of transforms.

Video decoder 300 may determine a second set of transforms based on the second intra prediction mode (260). For example, video decoder 300 may look up the second intra prediction mode in the lookup table to determine the second set of transforms.

Video decoder 300 may code (e.g., decode) the current block based on the SGPM, and at least one of the first set of transforms or the second set of transforms (262). For example, video decoder may apply one or more transforms of the first set of transforms or the second set of transforms as part of decoding the current block based on the SGPM.

In some examples, applying the Sobel-based intra prediction direction derivation includes applying a DIMD process to prediction block samples associated with the current block; and generating an HoG. In some examples, the first intra mode includes a highest HoG of the output of the Sobel-based intra prediction direction derivation. In some examples, the second intra mode includes a second highest HoG of the output of the Sobel-based intra prediction direction derivation.

In some examples, the first set of transforms includes at least one of one or more NSPT or one or more LFNST. In some examples, determining the first set of transforms based on the first intra mode includes looking up the first intra mode in a lookup table, and wherein determining the second set of transforms based on the second intra mode comprises looking up the second intra mode in the lookup table.

In some examples, video decoder 300 may determine a first transform, the first transform being a transform of the first set of transforms or the second set of transforms. In some examples, decoding the current block based on the SGPM, and at least one of the first set of transforms or the second set of transforms includes decoding the current block using the first transform. In some examples, determining the first transform includes receiving, in a bitstream, a syntax element whose value is indicative of the first transform and parsing the syntax element to determine the value, the value representing an index of the first set of transforms or the second set of transforms.

Figure 3:
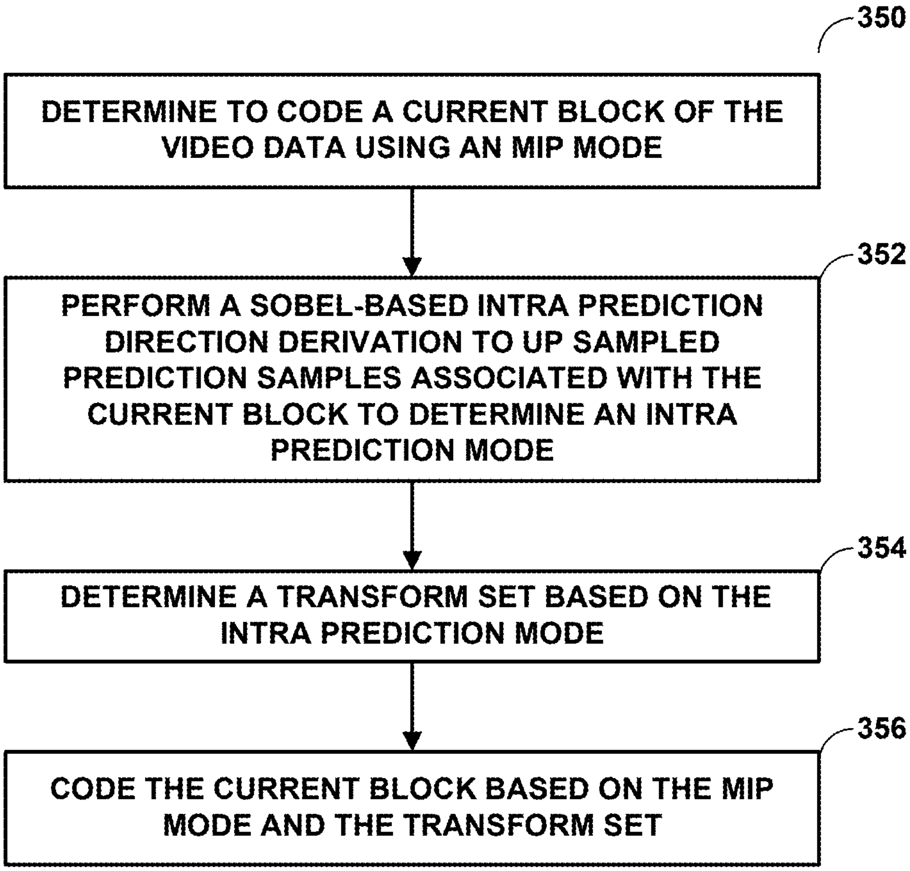
FIG. 3 is a flow chart illustrating example transform set selection techniques for matrix intra prediction (MIP) mode according to one or more aspects of this disclosure.

In some examples, the current block is a first current block and video encoder 200 and/or video decoder 300 may code another current block (e.g., a second current block) as described with respect to FIG. 3.

FIG. 3 is a flow chart illustrating example transform set selection techniques for matrix intra prediction (MIP) mode according to one or more aspects of this disclosure. While the techniques are described with respect to video decoder 300, such techniques may be performed by other devices, such as video encoder 200 or any other device capable of doing so.

Video decoder 300 may determining to code (e.g., decode) a current block of the video data using a matrix intra prediction (MIP) mode (350). For example, video encoder 200 may determine that using MIP mode is the most accurate and/or efficient way to encode the current block. Video encoder 200 may signal a syntax element in the bitstream indicative of the use of MIP mode for the current block. Video decoder 300 may obtain, from a bitstream a syntax element indicative of the use of MIP mode for the current block and may parse the syntax element to determine a value of the syntax element that indicates that MIP mode was used to encode the current block.

Video decoder 300 may perform a Sobel-based intra prediction direction derivation to up sampled prediction samples associated with the second current block to determine an intra prediction mode (352). For example, video decoder 300 may apply a DIMD process as part of performing the Sobel-based intra prediction direction derivation to derive an intra prediction mode.

Video decoder 300 may determine a transform set based on the intra prediction mode (354). For example, video decoder 300 may select an NSPT and LFSNT transform kernel set based on the intra prediction mode.

Video decoder 300 may code (e.g., decode) the second current block based on the MIP mode and the transform set (356). For example, video decoder 300 may apply one or more transforms of the determined transform set as part of decoding the second current block based on the MIP mode.

Figure 4:
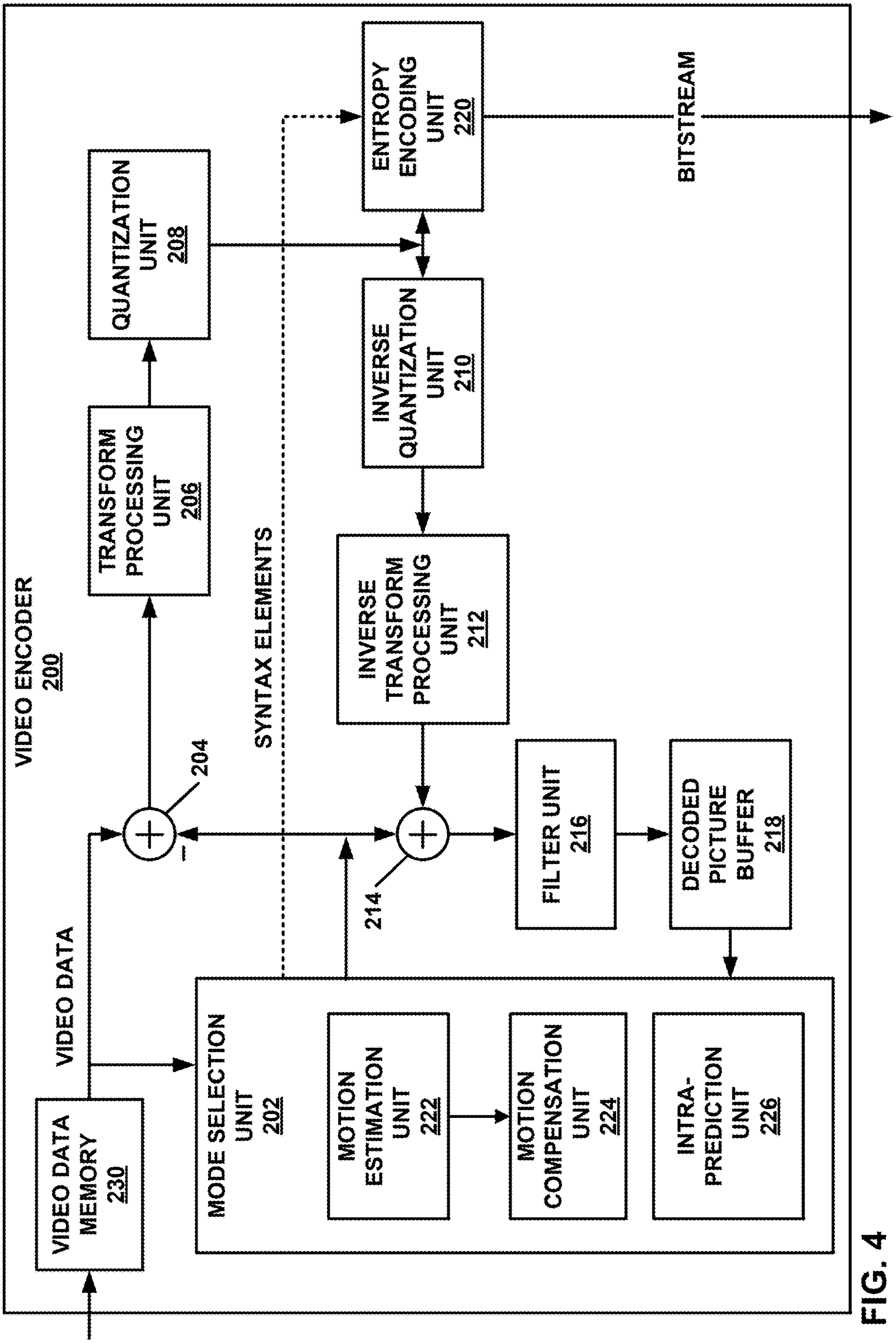
FIG. 4 is a block diagram illustrating an example video encoder that may perform the techniques of this disclosure.

FIG. 4 is a block diagram illustrating an example video encoder 200 that may perform the techniques of this disclosure. FIG. 4 is provided for purposes of explanation and should not be considered limiting of the techniques as broadly exemplified and described in this disclosure. For purposes of explanation, this disclosure describes video encoder 200 according to the techniques of VVC and HEVC. However, the techniques of this disclosure may be performed by video encoding devices that are configured to other video coding standards and video coding formats, such as AV1 and successors to the AV1 video coding format.

In the example of FIG. 4, video encoder 200 includes video data memory 230, mode selection unit 202, residual generation unit 204, transform processing unit 206, quantization unit 208, inverse quantization unit 210, inverse transform processing unit 212, reconstruction unit 214, filter unit 216, decoded picture buffer (DPB) 218, and entropy encoding unit 220. Any or all of video data memory 230, mode selection unit 202, residual generation unit 204, transform processing unit 206, quantization unit 208, inverse quantization unit 210, inverse transform processing unit 212, reconstruction unit 214, filter unit 216, DPB 218, and entropy encoding unit 220 may be implemented in one or more processors or in processing circuitry. For instance, the units of video encoder 200 may be implemented as one or more circuits or logic elements as part of hardware circuitry, or as part of a processor, ASIC, or FPGA. Moreover, video encoder 200 may include additional or alternative processors or processing circuitry to perform these and other functions.

Video data memory 230 is an example of a memory system that may store video data to be encoded by the components of video encoder 200. Video encoder 200 may receive the video data stored in video data memory 230 from, for example, video source 104 (FIG. 1). DPB 218 is an example of a memory system that may act as a reference picture memory that stores reference video data for use in prediction of subsequent video data by video encoder 200. Video data memory 230 and DPB 218 may each be formed by any of a variety of one or more memory devices or memory units, such as dynamic random access memory (DRAM), including synchronous DRAM (SDRAM), magnetoresistive RAM (MRAM), resistive RAM (RRAM), or other types of memory devices. Video data memory 230 and DPB 218 may be provided by the same memory device or separate memory devices. In various examples, video data memory 230 may be on-chip with other components of video encoder 200, as illustrated, or off-chip relative to those components.

In this disclosure, reference to video data memory 230 should not be interpreted as being limited to memory internal to video encoder 200, unless specifically described as such, or memory external to video encoder 200, unless specifically described as such. Rather, reference to video data memory 230 should be understood as reference memory that stores video data that video encoder 200 receives for encoding (e.g., video data for a current block that is to be encoded). Memory 106 of FIG. 1 may also provide temporary storage of outputs from the various units of video encoder 200.

The various units of FIG. 4 are illustrated to assist with understanding the operations performed by video encoder 200. The units may be implemented as fixed-function circuits, programmable circuits, or a combination thereof. Fixed-function circuits refer to circuits that provide particular functionality, and are preset on the operations that can be performed. Programmable circuits refer to circuits that can be programmed to perform various tasks, and provide flexible functionality in the operations that can be performed. For instance, programmable circuits may execute software or firmware that cause the programmable circuits to operate in the manner defined by instructions of the software or firmware. Fixed-function circuits may execute software instructions (e.g., to receive parameters or output parameters), but the types of operations that the fixed-function circuits perform are generally immutable. In some examples, one or more of the units may be distinct circuit blocks (fixed-function or programmable), and in some examples, one or more of the units may be integrated circuits.

Video encoder 200 may include arithmetic logic units (ALUs), elementary function units (EFUs), digital circuits, analog circuits, and/or programmable cores, formed from programmable circuits. In examples where the operations of video encoder 200 are performed using software executed by the programmable circuits, memory 106 (FIG. 1) may store the instructions (e.g., object code) of the software that video encoder 200 receives and executes, or another memory within video encoder 200 (not shown) may store such instructions.

Video data memory 230 is configured to store received video data. Video encoder 200 may retrieve a picture of the video data from video data memory 230 and provide the video data to residual generation unit 204 and mode selection unit 202. Video data in video data memory 230 may be raw video data that is to be encoded.

Mode selection unit 202 includes a motion estimation unit 222, a motion compensation unit 224, and an intra-prediction unit 226. Mode selection unit 202 may include additional functional units to perform video prediction in accordance with other prediction modes. As examples, mode selection unit 202 may include a palette unit, an intra-block copy unit (which may be part of motion estimation unit 222 and/or motion compensation unit 224), an affine unit, a linear model (LM) unit, or the like.

Mode selection unit 202 generally coordinates multiple encoding passes to test combinations of encoding parameters and resulting rate-distortion values for such combinations. The encoding parameters may include partitioning of CTUs into CUs, prediction modes for the CUS, transform types for residual data of the CUs, quantization parameters for residual data of the CUs, and so on. Mode selection unit 202 may ultimately select the combination of encoding parameters having rate-distortion values that are better than the other tested combinations.

Video encoder 200 may partition a picture retrieved from video data memory 230 into a series of CTUs, and encapsulate one or more CTUs within a slice. Mode selection unit 202 may partition a CTU of the picture in accordance with a tree structure, such as the MTT structure, QTBT structure. superblock structure, or the quad-tree structure described above. As described above, video encoder 200 may form one or more CUs from partitioning a CTU according to the tree structure. Such a CU may also be referred to generally as a “video block” or “block.”

In general, mode selection unit 202 also controls the components thereof (e.g., motion estimation unit 222, motion compensation unit 224, and intra-prediction unit 226) to generate a prediction block for a current block (e.g., a current CU, or in HEVC, the overlapping portion of a PU and a TU). For inter-prediction of a current block, motion estimation unit 222 may perform a motion search to identify one or more closely matching reference blocks in one or more reference pictures (e.g., one or more previously coded pictures stored in DPB 218). In particular, motion estimation unit 222 may calculate a value representative of how similar a potential reference block is to the current block, e.g., according to sum of absolute difference (SAD), sum of squared differences (SSD), mean absolute difference (MAD), mean squared differences (MSD), or the like. Motion estimation unit 222 may generally perform these calculations using sample-by-sample differences between the current block and the reference block being considered. Motion estimation unit 222 may identify a reference block having a lowest value resulting from these calculations, indicating a reference block that most closely matches the current block.

Motion estimation unit 222 may form one or more motion vectors (MVs) that defines the positions of the reference blocks in the reference pictures relative to the position of the current block in a current picture. Motion estimation unit 222 may then provide the motion vectors to motion compensation unit 224. For example, for uni-directional inter-prediction, motion estimation unit 222 may provide a single motion vector, whereas for bi-directional inter-prediction, motion estimation unit 222 may provide two motion vectors. Motion compensation unit 224 may then generate a prediction block using the motion vectors. For example, motion compensation unit 224 may retrieve data of the reference block using the motion vector. As another example, if the motion vector has fractional sample precision, motion compensation unit 224 may interpolate values for the prediction block according to one or more interpolation filters. Moreover, for bi-directional inter-prediction, motion compensation unit 224 may retrieve data for two reference blocks identified by respective motion vectors and combine the retrieved data, e.g., through sample-by-sample averaging or weighted averaging.

When operating according to the AV1 video coding format, motion estimation unit 222 and motion compensation unit 224 may be configured to encode coding blocks of video data (e.g., both luma and chroma coding blocks) using translational motion compensation, affine motion compensation, overlapped block motion compensation (OBMC), and/or compound inter-intra prediction.

As another example, for intra-prediction, or intra-prediction coding, intra-prediction unit 226 may generate the prediction block from samples neighboring the current block. For example, for directional modes, intra-prediction unit 226 may generally mathematically combine values of neighboring samples and populate these calculated values in the defined direction across the current block to produce the prediction block. As another example, for DC mode, intra-prediction unit 226 may calculate an average of the neighboring samples to the current block and generate the prediction block to include this resulting average for each sample of the prediction block.

When operating according to the AV1 video coding format, intra-prediction unit 226 may be configured to encode coding blocks of video data (e.g., both luma and chroma coding blocks) using directional intra prediction, non-directional intra prediction, recursive filter intra prediction, chroma-from-luma (CFL) prediction, intra block copy (IBC), and/or color palette mode. Mode selection unit 202 may include additional functional units to perform video prediction in accordance with other prediction modes.

Mode selection unit 202 provides the prediction block to residual generation unit 204. Residual generation unit 204 receives a raw, unencoded version of the current block from video data memory 230 and the prediction block from mode selection unit 202. Residual generation unit 204 calculates sample-by-sample differences between the current block and the prediction block. The resulting sample-by-sample differences define a residual block for the current block. In some examples, residual generation unit 204 may also determine differences between sample values in the residual block to generate a residual block using residual differential pulse code modulation (RDPCM). In some examples, residual generation unit 204 may be formed using one or more subtractor circuits that perform binary subtraction.

In examples where mode selection unit 202 partitions CUs into PUs, each PU may be associated with a luma prediction unit and corresponding chroma prediction units. Video encoder 200 and video decoder 300 may support PUs having various sizes. As indicated above, the size of a CU may refer to the size of the luma coding block of the CU and the size of a PU may refer to the size of a luma prediction unit of the PU. Assuming that the size of a particular CU is 2N×2N, video encoder 200 may support PU sizes of 2N×2N or N×N for intra prediction, and symmetric PU sizes of 2N×2N, 2N×N, N×2N, N×N, or similar for inter prediction. Video encoder 200 and video decoder 300 may also support asymmetric partitioning for PU sizes of 2N×nU, 2N×nD, nL×2N, and nR×2N for inter prediction.

In examples where mode selection unit 202 does not further partition a CU into PUs, each CU may be associated with a luma coding block and corresponding chroma coding blocks. As above, the size of a CU may refer to the size of the luma coding block of the CU. The video encoder 200 and video decoder 300 may support CU sizes of 2N×2N, 2N×N, or N×2N.

For other video coding techniques such as an intra-block copy mode coding, an affine-mode coding, and linear model (LM) mode coding, as some examples, mode selection unit 202, via respective units associated with the coding techniques, generates a prediction block for the current block being encoded. In some examples, such as palette mode coding, mode selection unit 202 may not generate a prediction block, and instead generate syntax elements that indicate the manner in which to reconstruct the block based on a selected palette. In such modes, mode selection unit 202 may provide these syntax elements to entropy encoding unit 220 to be encoded.

As described above, residual generation unit 204 receives the video data for the current block and the corresponding prediction block. Residual generation unit 204 then generates a residual block for the current block. To generate the residual block, residual generation unit 204 calculates sample-by-sample differences between the prediction block and the current block.

Transform processing unit 206 applies one or more transforms to the residual block to generate a block of transform coefficients (referred to herein as a "transform coefficient block"). Transform processing unit 206 may apply various transforms to a residual block to form the transform coefficient block. For example, transform processing unit 206 may apply a discrete cosine transform (DCT), a directional transform, a Karhunen-Loeve transform (KLT), or a conceptually similar transform to a residual block. In some examples, transform processing unit 206 may perform multiple transforms to a residual block, e.g., a primary transform and a secondary transform, such as a rotational transform. In some examples, transform processing unit 206 does not apply transforms to a residual block.

When operating according to AV1, transform processing unit 206 may apply one or more transforms to the residual block to generate a block of transform coefficients (referred to herein as a "transform coefficient block"). Transform processing unit 206 may apply various transforms to a residual block to form the transform coefficient block. For example, transform processing unit 206 may apply a horizontal/vertical transform combination that may include a discrete cosine transform (DCT), an asymmetric discrete sine transform (ADST), a flipped ADST (e.g., an ADST in reverse order), and an identity transform (IDTX). When using an identity transform, the transform is skipped in one of the vertical or horizontal directions. In some examples, transform processing may be skipped.

Quantization unit 208 may quantize the transform coefficients in a transform coefficient block, to produce a quantized transform coefficient block. Quantization unit 208 may quantize transform coefficients of a transform coefficient block according to a quantization parameter (QP) value associated with the current block. Video encoder 200 (e.g., via mode selection unit 202) may adjust the degree of quantization applied to the transform coefficient blocks associated with the current block by adjusting the QP value associated with the CU. Quantization may introduce loss of information, and thus, quantized transform coefficients may have lower precision than the original transform coefficients produced by transform processing unit 206.

Inverse quantization unit 210 and inverse transform processing unit 212 may apply inverse quantization and inverse transforms to a quantized transform coefficient block, respectively, to reconstruct a residual block from the transform coefficient block. Reconstruction unit 214 may produce a reconstructed block corresponding to the current block (albeit potentially with some degree of distortion)

based on the reconstructed residual block and a prediction block generated by mode selection unit 202. For example, reconstruction unit 214 may add samples of the reconstructed residual block to corresponding samples from the prediction block generated by mode selection unit 202 to produce the reconstructed block.

Filter unit 216 may perform one or more filter operations on reconstructed blocks. For example, filter unit 216 may perform deblocking operations to reduce blockiness artifacts along edges of CUs. Operations of filter unit 216 may be skipped, in some examples.

When operating according to AV1, filter unit 216 may perform one or more filter operations on reconstructed blocks. For example, filter unit 216 may perform deblocking operations to reduce blockiness artifacts along edges of CUs. In other examples, filter unit 216 may apply a constrained directional enhancement filter (CDEF), which may be applied after deblocking, and may include the application of non-separable, non-linear, low-pass directional filters based on estimated edge directions. Filter unit 216 may also include a loop restoration filter, which is applied after CDEF, and may include a separable symmetric normalized Wiener filter or a dual self-guided filter.

Video encoder 200 stores reconstructed blocks in DPB 218. For instance, in examples where operations of filter unit 216 are not performed, reconstruction unit 214 may store reconstructed blocks to DPB 218. In examples where operations of filter unit 216 are performed, filter unit 216 may store the filtered reconstructed blocks to DPB 218. Motion estimation unit 222 and motion compensation unit 224 may retrieve a reference picture from DPB 218, formed from the reconstructed (and potentially filtered) blocks, to inter-predict blocks of subsequently encoded pictures. In addition, intra-prediction unit 226 may use reconstructed blocks in DPB 218 of a current picture to intra-predict other blocks in the current picture.

In general, entropy encoding unit 220 may entropy encode syntax elements received from other functional components of video encoder 200. For example, entropy encoding unit 220 may entropy encode quantized transform coefficient blocks from quantization unit 208. As another example, entropy encoding unit 220 may entropy encode prediction syntax elements (e.g., motion information for inter-prediction or intra-mode information for intra-prediction) from mode selection unit 202. Entropy encoding unit 220 may perform one or more entropy encoding operations on the syntax elements, which are another example of video data, to generate entropy-encoded data. For example, entropy encoding unit 220 may perform a context-adaptive variable length coding (CAVLC) operation, a CABAC operation, a variable-to-variable (V2V) length coding operation, a syntax-based context-adaptive binary arithmetic coding (SBAC) operation, a Probability Interval Partitioning Entropy (PIPE) coding operation, an Exponential-Golomb encoding operation, or another type of entropy encoding operation on the data. In some examples, entropy encoding unit 220 may operate in bypass mode where syntax elements are not entropy encoded.

Video encoder 200 may output a bitstream that includes the entropy encoded syntax elements needed to reconstruct blocks of a slice or picture. In particular, entropy encoding unit 220 may output the bitstream.

In accordance with AV1, entropy encoding unit 220 may be configured as a symbol-to-symbol adaptive multi-symbol arithmetic coder. A syntax element in AV1 includes an alphabet of N elements, and a context (e.g., probability model) includes a set of N probabilities. Entropy encoding unit 220 may store the probabilities as n-bit (e.g., 15-bit) cumulative distribution functions (CDFs). Entropy encoding unit 220 may perform recursive scaling, with an update factor based on the alphabet size, to update the contexts.

The operations described above are described with respect to a block. Such description should be understood as being operations for a luma coding block and/or chroma coding blocks. As described above, in some examples, the luma coding block and chroma coding blocks are luma and chroma components of a CU. In some examples, the luma coding block and the chroma coding blocks are luma and chroma components of a PU.

In some examples, operations performed with respect to a luma coding block need not be repeated for the chroma coding blocks. As one example, operations to identify a motion vector (MV) and reference picture for a luma coding block need not be repeated for identifying a MV and reference picture for the chroma blocks. Rather, the MV for the luma coding block may be scaled to determine the MV for the chroma blocks, and the reference picture may be the same. As another example, the intra-prediction process may be the same for the luma coding block and the chroma coding blocks.

Video encoder 200 represents an example of a device configured to encode video data including one or more memories configured to store video data, and one or more processing units implemented in circuitry and configured to: determine to use a spatial geometric partition mode (SGPM) for a block of video data; perform a Sobel-based intra prediction direction derivation for the block; determine a first highest intra mode based on an output of the Sobel-based intra prediction direction derivation; determine a second highest intra mode based on the output of the Sobel-based intra prediction direction derivation; determine a first set of non-separable primary transform (NSPT) and a low frequency non-separable transform (LFSNT) transforms based on the first highest intra mode; determine a second set of transforms based on the second highest intra mode; and encode the block based on the SGPM, the first set of transforms, and the second set of transforms.

Video encoder 200 also represents an example of a device configured to encode video data including one or more memories configured to store video data, and one or more processing units implemented in circuitry and configured to: determine to code a block of the video data using a matrix intra prediction (MIP) mode; apply a Sobel-based decoder-side intra mode derivation (DIMD) process to up sampled prediction samples associated with the block to determine an intra mode for a non-separable primary transform (NSPT) and low frequency non-separable transform (LFSNT) transform kernel set selection; select the NSPT and LFSNT transform kernel set based on the intra mode; and encode the block based on the MIP mode and the selected NSPT and LESNT transform kernel set.

Figure 5:
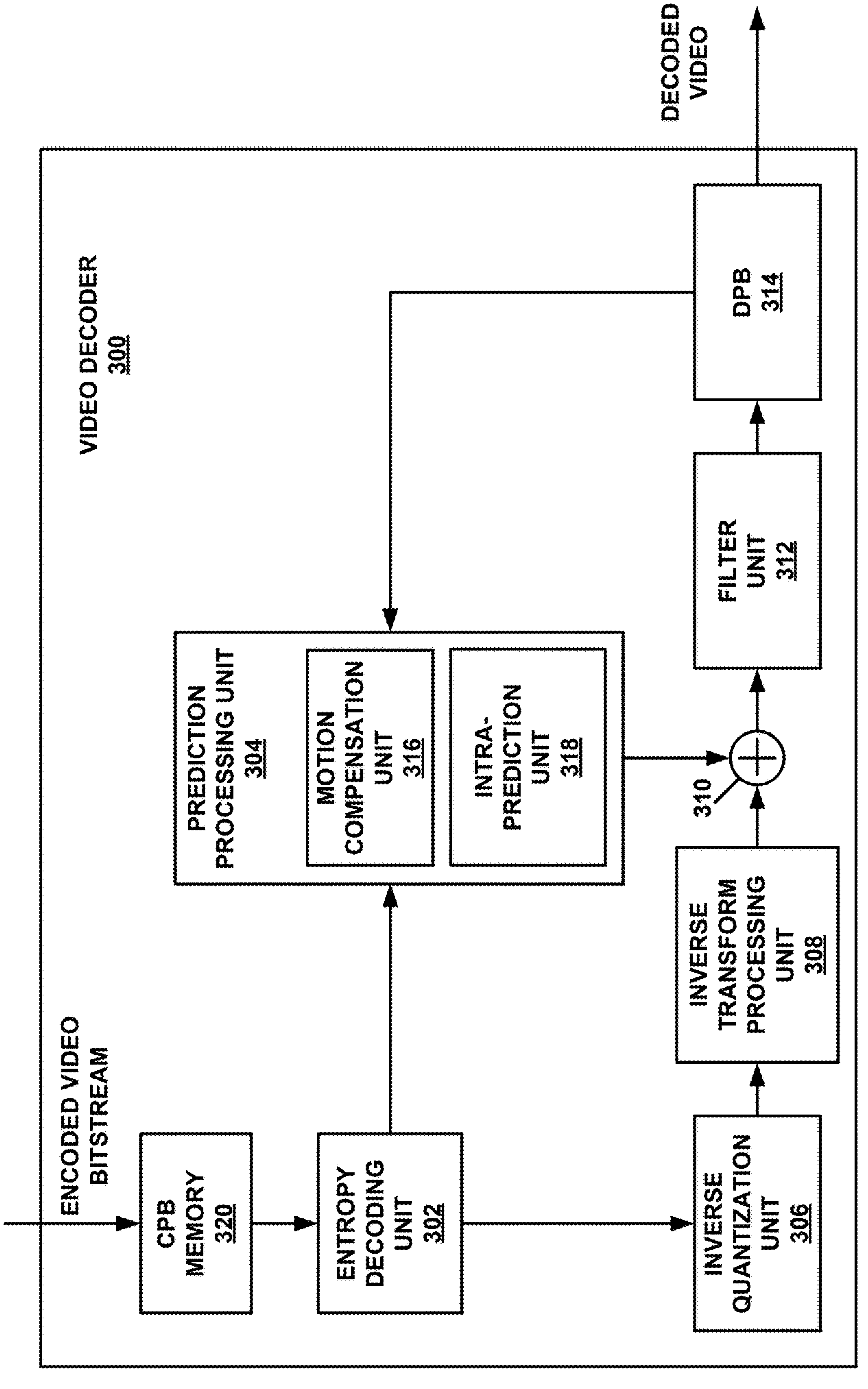
FIG. 5 is a block diagram illustrating an example video decoder that may perform the techniques of this disclosure.

FIG. 5 is a block diagram illustrating an example video decoder 300 that may perform the techniques of this disclosure. FIG. 5 is provided for purposes of explanation and is not limiting on the techniques as broadly exemplified and described in this disclosure. For purposes of explanation, this disclosure describes video decoder 300 according to the techniques of VVC and HEVC. However, the techniques of this disclosure may be performed by video coding devices that are configured to other video coding standards.

In the example of FIG. 5, video decoder 300 includes coded picture buffer (CPB) memory 320, entropy decoding unit 302, prediction processing unit 304, inverse quantization unit 306, inverse transform processing unit 308, reconstruction unit 310, filter unit 312, and DPB 314. Any or all of CPB memory 320, entropy decoding unit 302, prediction processing unit 304, inverse quantization unit 306, inverse transform processing unit 308, reconstruction unit 310, filter unit 312, and DPB 314 may be implemented in one or more processors or in processing circuitry. For instance, the units of video decoder 300 may be implemented as one or more circuits or logic elements as part of hardware circuitry, or as part of a processor, ASIC, or FPGA. Moreover, video decoder 300 may include additional or alternative processors or processing circuitry to perform these and other functions.

Prediction processing unit 304 includes motion compensation unit 316 and intra-prediction unit 318. Prediction processing unit 304 may include additional units to perform prediction in accordance with other prediction modes. As examples, prediction processing unit 304 may include a palette unit, an intra-block copy unit (which may form part of motion compensation unit 316), an affine unit, a linear model (LM) unit, or the like. In other examples, video decoder 300 may include more, fewer, or different functional components.

When operating according to AV1, motion compensation unit 316 may be configured to decode coding blocks of video data (e.g., both luma and chroma coding blocks) using translational motion compensation, affine motion compensation, OBMC, and/or compound inter-intra prediction, as described above. Intra-prediction unit 318 may be configured to decode coding blocks of video data (e.g., both luma and chroma coding blocks) using directional intra prediction, non-directional intra prediction, recursive filter intra prediction, CFL, IBC, and/or color palette mode, as described above.

CPB memory 320 is an example of a memory system that may store video data, such as an encoded video bitstream, to be decoded by the components of video decoder 300. The video data stored in CPB memory 320 may be obtained, for example, from computer-readable medium 110 (FIG. 1). CPB memory 320 may include a CPB that stores encoded video data (e.g., syntax elements) from an encoded video bitstream. Also, CPB memory 320 may store video data other than syntax elements of a coded picture, such as temporary data representing outputs from the various units of video decoder 300. DPB 314 is an example of a memory system that generally stores decoded pictures, which video decoder 300 may output and/or use as reference video data when decoding subsequent data or pictures of the encoded video bitstream. CPB memory 320 and DPB 314 may each be formed by any of a variety of memory devices or memory units, such as DRAM, including SDRAM, MRAM, RRAM, or other types of memory devices. CPB memory 320 and DPB 314 may be provided by the same memory device or separate memory devices. In various examples, CPB memory 320 may be on-chip with other components of video decoder 300, or off-chip relative to those components.

Additionally or alternatively, in some examples, video decoder 300 may retrieve coded video data from memory 120 (FIG. 1). That is, memory 120 may store data as discussed above with CPB memory 320. Likewise, memory 120 may store instructions to be executed by video decoder 300, when some or all of the functionality of video decoder 300 is implemented in software to be executed by processing circuitry of video decoder 300.

The various units shown in FIG. 5 are illustrated to assist with understanding the operations performed by video decoder 300. The units may be implemented as fixed-function circuits, programmable circuits, or a combination thereof. Similar to FIG. 4, fixed-function circuits refer to circuits that provide particular functionality, and are preset on the operations that can be performed. Programmable circuits refer to circuits that can be programmed to perform various tasks, and provide flexible functionality in the operations that can be performed. For instance, programmable circuits may execute software or firmware that cause the programmable circuits to operate in the manner defined by instructions of the software or firmware. Fixed-function circuits may execute software instructions (e.g., to receive parameters or output parameters), but the types of operations that the fixed-function circuits perform are generally immutable. In some examples, one or more of the units may be distinct circuit blocks (fixed-function or programmable), and in some examples, one or more of the units may be integrated circuits.

Video decoder 300 may include ALUs, EFUs, digital circuits, analog circuits, and/or programmable cores formed from programmable circuits. In examples where the operations of video decoder 300 are performed by software executing on the programmable circuits, on-chip or off-chip memory may store instructions (e.g., object code) of the software that video decoder 300 receives and executes.

Entropy decoding unit 302 may receive encoded video data from the CPB and entropy decode the video data to reproduce syntax elements. Prediction processing unit 304, inverse quantization unit 306, inverse transform processing unit 308, reconstruction unit 310, and filter unit 312 may generate decoded video data based on the syntax elements extracted from the bitstream.

In general, video decoder 300 reconstructs a picture on a block-by-block basis. Video decoder 300 may perform a reconstruction operation on each block individually (where the block currently being reconstructed, i.e., decoded, may be referred to as a "current block").

Entropy decoding unit 302 may entropy decode syntax elements defining quantized transform coefficients of a quantized transform coefficient block, as well as transform information, such as a quantization parameter (QP) and/or transform mode indication(s). Inverse quantization unit 306 may use the QP associated with the quantized transform coefficient block to determine a degree of quantization and, likewise, a degree of inverse quantization for inverse quantization unit 306 to apply. Inverse quantization unit 306 may, for example, perform a bitwise left-shift operation to inverse quantize the quantized transform coefficients. Inverse quantization unit 306 may thereby form a transform coefficient block including transform coefficients.

After inverse quantization unit 306 forms the transform coefficient block, inverse transform processing unit 308 may apply one or more inverse transforms to the transform coefficient block to generate a residual block associated with the current block. For example, inverse transform processing unit 308 may apply an inverse DCT, an inverse integer transform, an inverse Karhunen-Loeve transform (KLT), an inverse rotational transform, an inverse directional transform, or another inverse transform to the transform coefficient block.

Furthermore, prediction processing unit 304 generates a prediction block according to prediction information syntax elements that were entropy decoded by entropy decoding unit 302. For example, if the prediction information syntax elements indicate that the current block is inter-predicted, motion compensation unit 316 may generate the prediction block. In this case, the prediction information syntax elements may indicate a reference picture in DPB 314 from which to retrieve a reference block, as well as a motion vector identifying a location of the reference block in the reference picture relative to the location of the current block in the current picture. Motion compensation unit 316 may generally perform the inter-prediction process in a manner that is substantially similar to that described with respect to motion compensation unit 224 (FIG. 4).

As another example, if the prediction information syntax elements indicate that the current block is intra-predicted, intra-prediction unit 318 may generate the prediction block according to an intra-prediction mode indicated by the prediction information syntax elements. Again, intra-prediction unit 318 may generally perform the intra-prediction process in a manner that is substantially similar to that described with respect to intra-prediction unit 226 (FIG. 4). Intra-prediction unit 318 may retrieve data of neighboring samples to the current block from DPB 314.

Reconstruction unit 310 may reconstruct the current block using the prediction block and the residual block. For example, reconstruction unit 310 may add samples of the residual block to corresponding samples of the prediction block to reconstruct the current block.

Filter unit 312 may perform one or more filter operations on reconstructed blocks. For example, filter unit 312 may perform deblocking operations to reduce blockiness artifacts along edges of the reconstructed blocks. Operations of filter unit 312 are not necessarily performed in all examples.

Video decoder 300 may store the reconstructed blocks in DPB 314. For instance, in examples where operations of filter unit 312 are not performed, reconstruction unit 310 may store reconstructed blocks to DPB 314. In examples where operations of filter unit 312 are performed, filter unit 312 may store the filtered reconstructed blocks to DPB 314. As discussed above, DPB 314 may provide reference information, such as samples of a current picture for intra-prediction and previously decoded pictures for subsequent motion compensation, to prediction processing unit 304. Moreover, video decoder 300 may output decoded pictures (e.g., decoded video) from DPB 314 for subsequent presentation on a display device, such as display device 118 of FIG. 1.

In this manner, video decoder 300 represents an example of a video decoding device including one or more memories configured to store video data, and one or more processing units implemented in circuitry and configured to: determine to use a spatial geometric partition mode (SGPM) for a block of video data; performing a Sobel-based intra prediction direction derivation for the block; determine a first highest intra mode based on an output of the Sobel-based intra prediction direction derivation; determine a second highest intra mode based on the output of the Sobel-based intra prediction direction derivation; determine a first set of non-separable primary transform (NSPT) and a low frequency non-separable transform (LFSNT) transforms based on the first highest intra mode; determine a second set of transforms based on the second highest intra mode; and decode the block based on the SGPM, the first set of transforms, and the second set of transforms.

Video decoder 300 also represents an example of a video decoding device including one or more memories configured to store video data, and one or more processing units implemented in circuitry and configured to: determine to code a block of the video data using a matrix intra prediction (MIP) mode; apply a Sobel-based decoder-side intra mode derivation (DIMD) process to up sampled prediction samples associated with the block to determine an intra mode for a non-separable primary transform (NSPT) and low frequency non-separable transform (LFSNT) transform kernel set selection; select the NSPT and LFSNT transform kernel set based on the intra mode; and decode the block based on the MIP mode and the selected NSPT and LFSNT transform kernel set.

Figure 6:
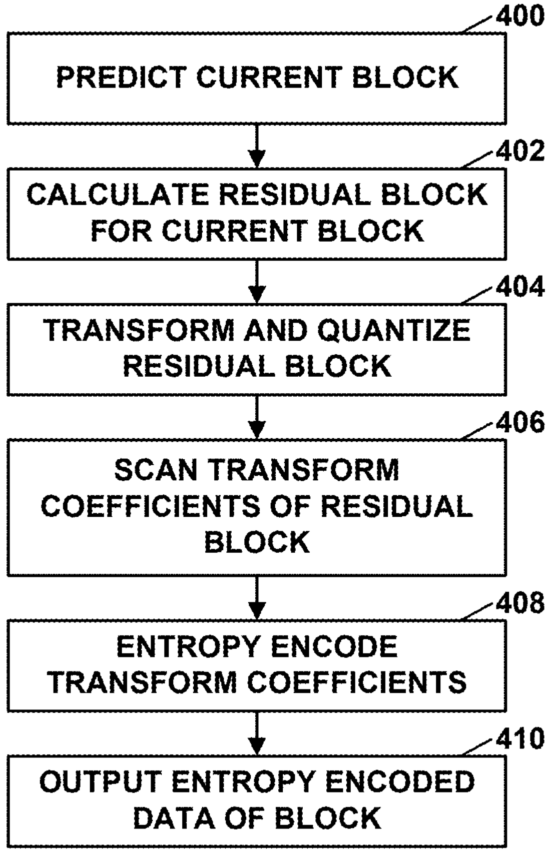
FIG. 6 is a flowchart illustrating an example method for encoding a current block in accordance with the techniques of this disclosure.

FIG. 6 is a flowchart illustrating an example method for encoding a current block in accordance with the techniques of this disclosure. The current block may be or include a current CU. Although described with respect to video encoder 200 (FIGS. 1 and 4), it should be understood that other devices may be configured to perform a method similar to that of FIG. 6.

In this example, video encoder 200 initially predicts the current block (400). For example, video encoder 200 may form a prediction block for the current block. Video encoder 200 may then calculate a residual block for the current block (402). To calculate the residual block, video encoder 200 may calculate a difference between the original, unencoded block and the prediction block for the current block. Video encoder 200 may then transform the residual block and quantize transform coefficients of the residual block (404). Next, video encoder 200 may scan the quantized transform coefficients of the residual block (406). During the scan, or following the scan, video encoder 200 may entropy encode the transform coefficients (408). For example, video encoder 200 may encode the transform coefficients using CAVLC or CABAC. Video encoder 200 may then output the entropy encoded data of the block (410).

Figure 7:
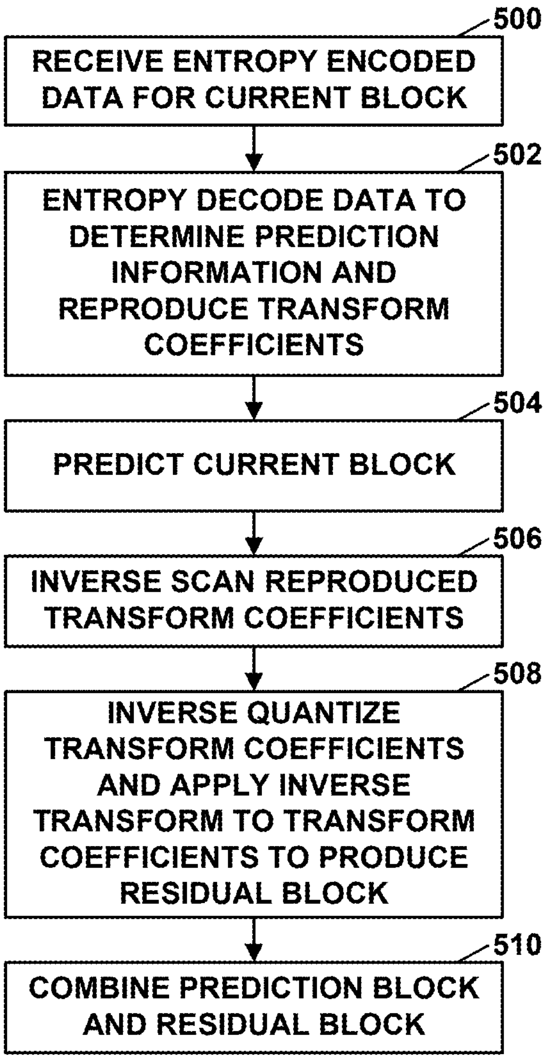
FIG. 7 is a flowchart illustrating an example method for decoding a current block in accordance with the techniques of this disclosure.

FIG. 7 is a flowchart illustrating an example method for decoding a current block of video data in accordance with the techniques of this disclosure. The current block may be or include a current CU. Although described with respect to video decoder 300 (FIGS. 1 and 5), it should be understood that other devices may be configured to perform a method similar to that of FIG. 7.

Video decoder 300 may receive entropy encoded data for the current block, such as entropy encoded prediction information and entropy encoded data for transform coefficients of a residual block corresponding to the current block (500). Video decoder 300 may entropy decode the entropy encoded data to determine prediction information for the current block and to reproduce transform coefficients of the residual block (502). Video decoder 300 may predict the current block (504), e.g., using an intra- or inter-prediction mode as indicated by the prediction information for the current block, to calculate a prediction block for the current block. Video decoder 300 may then inverse scan the reproduced transform coefficients (506), to create a block of quantized transform coefficients. Video decoder 300 may then inverse quantize the transform coefficients and apply an inverse transform to the transform coefficients to produce a residual block (508). Video decoder 300 may ultimately decode the current block by combining the prediction block and the residual block (510).

The following numbered clauses illustrate one or more aspects of the devices and techniques described in this disclosure.

Aspect 1A. A method of coding video data, the method comprising: determining to use a spatial geometric partition mode (SGPM) for a block of video data; performing a Sobel-based intra prediction direction derivation for the block; determining a first highest intra mode based on an output of the Sobel-based intra prediction direction derivation; determining a second highest intra mode based on the output of the Sobel-based intra prediction direction derivation; determining a first set of non-separable primary transform (NSPT) and a low frequency non-separable transform (LFSNT) transforms based on the first highest intra mode; determining a second set of transforms based on the second highest intra mode; and coding the block based on the SGPM, the first set of transforms, and the second set of transforms.

Aspect 2A. The method of aspect 1A, wherein applying the Sobel-based intra prediction direction derivation comprises applying a decoder-side intra mode derivation (DIMD) process to prediction block samples associated with the block.

Aspect 3A. The method of aspect 1A or aspect 2A, wherein the output of the Sobel-based intra prediction direction derivation comprises a histogram of gradients.

Aspect 4A. A method of coding video data, the method comprising: determining to code a block of the video data using a matrix intra prediction (MIP) mode; applying a Sobel-based decoder-side intra mode derivation (DIMD) process to up sampled prediction samples associated with the block to determine an intra mode for a non-separable primary transform (NSPT) and low frequency non-separable transform (LFSNT) transform kernel set selection; selecting the NSPT and LFSNT transform kernel set based on the intra mode; and coding the block based on the MIP mode and the selected NSPT and LFSNT transform kernel set.

Aspect 5A. The method of any of aspects 1A-4A, wherein coding comprises decoding.

Aspect 6A. The method of any of aspects 1A-5A, wherein coding comprises encoding.

Aspect 7A. A device for coding video data, the device comprising one or more means for performing the method of any of aspects 1A-6A.

Aspect 8A. The device of aspect 7A, wherein the one or more means comprise one or more processors implemented in circuitry.

Aspect 9A. The device of any of aspects 7A or 8A, further comprising a memory to store the video data.

Aspect 10A. The device of any of aspects 7A-9A, further comprising a display configured to display decoded video data.

Aspect 11A. The device of any of aspects 7A-10A, wherein the device comprises one or more of a camera, a computer, a mobile device, a broadcast receiver device, or a set-top box.

Aspect 12A. The device of any of aspects 7A-11A, wherein the device comprises a video decoder.

Aspect 13A. The device of any of aspects 7A-12A, wherein the device comprises a video encoder.

Aspect 14A. Computer-readable storage media having stored thereon instructions that, when executed, cause one or more processors to perform the method of any of aspects 1A-6A.

Aspect 1B. A method of decoding video data, the method comprising: determining to use a spatial geometric partition mode (SGPM) for a current block of the video data; performing a Sobel-based intra prediction direction derivation for the current block; determining a first intra prediction mode of a plurality of intra prediction modes based on an output of the Sobel-based intra prediction direction derivation; determining a second intra prediction mode of the plurality of intra prediction modes based on the output of the Sobel-based intra prediction direction derivation; determining a first set of transforms based on the first intra prediction mode; determining a second set of transforms based on the second intra prediction mode; and decoding the current block based on the SGPM, and at least one of the first set of transforms or the second set of transforms.

Aspect 2B. The method of aspect 1B, wherein applying the Sobel-based intra prediction direction derivation comprises: applying a decoder-side intra mode derivation (DIMD) process to prediction block samples associated with the current block; and generating a histogram of gradients (HoG).

Aspect 3B. The method of aspect 2B, wherein the first intra prediction mode comprises a highest HoG of the output of the Sobel-based intra prediction direction derivation.

Aspect 4B. The method of aspect 3B, wherein the second intra prediction mode comprises a second highest HoG of the output of the Sobel-based intra prediction direction derivation.

Aspect 5B. The method of any of aspects 1B-4B, wherein the first set of transforms comprises at least one of one or more non-separable primary transform (NSPT) or one or more low frequency non-separable transform (LFNST).

Aspect 6B. The method of any of aspects 1B-5B, wherein determining the first set of transforms based on the first intra prediction mode comprises looking up the first intra prediction mode in a lookup table, and wherein determining the second set of transforms based on the second intra prediction mode comprises looking up the second intra prediction mode in the lookup table.

Aspect 7B. The method of any of aspects 1B-6B, further comprising: determining a first transform, the first transform being a transform of the first set of transforms or the second set of transforms, wherein decoding the current block based on the SGPM, and at least one of the first set of transforms or the second set of transforms comprises decoding the current block using the first transform.

Aspect 8B. The method of aspect 7B, wherein determining the first transform comprises: receiving, in a bitstream, a syntax element whose value is indicative of the first transform; and parsing the syntax element to determine the value, the value representing an index of the first set of transforms or the second set of transforms.

Aspect 9B. The method of any of aspects 1B-8B, wherein the current block is a first current block, the method further comprising: determining to decode a second current block of the video data using a matrix intra prediction (MIP) mode; performing the Sobel-based intra prediction direction derivation to up sampled prediction samples associated with the second current block to determine a third intra prediction mode; determining a transform set based on the third intra prediction mode; and decoding the second current block based on the MIP mode and the transform set.

Aspect 10B. A device for decoding video data, the device comprising: one or more memories configured to store the video data; and one or more processors implemented in circuitry and operably coupled to the one or more memories, the one or more processors configured to: determine to use a spatial geometric partition mode (SGPM) for a current block of the video data; perform a Sobel-based intra prediction direction derivation for the current block; determine a first intra prediction mode of a plurality of intra prediction modes based on an output of the Sobel-based intra prediction direction derivation; determine a second intra prediction mode of the plurality of intra prediction modes based on the output of the Sobel-based intra prediction direction derivation; determine a first set of transforms based on the first intra prediction mode; determine a second set of transforms based on the second intra prediction mode; and decode the current block based on the SGPM, and at least one of the first set of transforms or the second set of transforms.

Aspect 11B. The device of aspect 10B, wherein as part of applying the Sobel-based intra prediction direction derivation, the one or more processors are configured to: apply a decoder-side intra mode derivation (DIMD) process to prediction block samples associated with the current block; and generate a histogram of gradients (HoG).

Aspect 12B. The device of aspect 11B, wherein the first intra prediction mode comprises a highest HoG of the output of the Sobel-based intra prediction direction derivation.

Aspect 13B. The device of aspect 12B, wherein the second intra prediction mode comprises a second highest HoG of the output of the Sobel-based intra prediction direction derivation.

Aspect 14B. The device of any of aspects 10B-13B, wherein the first set of transforms comprises at least one of one or more non-separable primary transform (NSPT) or one or more low frequency non-separable transform (LFNST).

Aspect 15B. The device of any of aspects 10B-14B, wherein as part of determining the first set of transforms based on the first intra prediction mode, the one or more processors are configured to look up the first intra prediction mode in a lookup table, and wherein as part of determining the second set of transforms based on the second intra prediction mode, the one or more processors are configured to look up the second intra prediction mode in the lookup table.

Aspect 16B. The device of any of aspects 10B-15B, wherein the one or more processors are further configured to: determine a first transform, the first transform being a transform of the first set of transforms or the second set of transforms, wherein as part of decoding the current block based on the SGPM, and at least one of the first set of transforms or the second set of transforms, the one or more processors are configured to decode the current block using the first transform.

Aspect 17B. The device of aspect 16B, wherein as part of determining the first transform, the one or more processors are configured to: receive, in a bitstream, a syntax element whose value is indicative of the first transform; and parse the syntax element to determine the value, the value representing an index of the first set of transforms or the second set of transforms.

Aspect 18B. The device of any of aspects 10B-17B, wherein the current block is a first current block, and the one or more processors are further configured to: determine to decode a second current block of the video data using a matrix intra prediction (MIP) mode; perform the Sobel-based intra prediction direction derivation to up sampled prediction samples associated with the second current block to determine a third intra prediction mode; determine a transform set based on the third intra prediction mode; and decode the second current block based on the MIP mode and the transform set.

Aspect 19B. The device of any of aspects 10B-18B, wherein the device comprises one or more of a camera, a computer, a mobile device, a broadcast receiver device, or a set-top box.

Aspect 20B. A method for encoding video data, the method comprising: determining to use a spatial geometric partition mode (SGPM) for a current block of the video data; performing a Sobel-based intra prediction direction derivation for the current block; determining a first intra prediction mode of a plurality of intra prediction modes based on an output of the Sobel-based intra prediction direction derivation; determining a second intra prediction mode of the plurality of intra prediction modes based on the output of the Sobel-based intra prediction direction derivation; determining a first set of transforms based on the first intra prediction mode; determining a second set of transforms based on the second intra prediction mode; and encoding the current block based on the SGPM, and at least one of the first set of transforms or the second set of transforms.

Computer-readable storage media having stored thereon instructions that, when executed, cause one or more processors to: determine to use a spatial geometric partition mode (SGPM) for a current block of video data; perform a Sobel-based intra prediction direction derivation for the current block; determine a first intra prediction mode of a plurality of intra prediction modes based on an output of the Sobel-based intra prediction direction derivation; determine a second intra prediction mode of the plurality of intra prediction modes based on the output of the Sobel-based intra prediction direction derivation; determine a first set of transforms based on the first intra prediction mode; determine a second set of transforms based on the second intra prediction mode; and decode the current block based on the SGPM, and at least one of the first set of transforms or the second set of transforms.

It is to be recognized that depending on the example, certain acts or events of any of the techniques described herein can be performed in a different sequence, may be added, merged, or left out altogether (e.g., not all described acts or events are necessary for the practice of the techniques). Moreover, in certain examples, acts or events may be performed concurrently, e.g., through multi-threaded processing, interrupt processing, or multiple processors, rather than sequentially.

In one or more examples, the functions described may be implemented in hardware, software, firmware, or any combination thereof. If implemented in software, the functions may be stored on or transmitted over as one or more instructions or code on a computer-readable medium and executed by a hardware-based processing unit. Computer-readable media may include computer-readable storage media, which corresponds to a tangible medium such as data storage media, or communication media including any medium that facilitates transfer of a computer program from one place to another, e.g., according to a communication protocol. In this manner, computer-readable media generally may correspond to (1) tangible computer-readable storage media which is non-transitory or (2) a communication medium such as a signal or carrier wave. Data storage media may be any available media that can be accessed by one or more computers or one or more processors to retrieve instructions, code and/or data structures for implementation of the techniques described in this disclosure. A computer program product may include a computer-readable medium.

By way of example, and not limitation, such computer-readable storage media may include one or more of RAM, ROM, EEPROM, CD-ROM or other optical disk storage, magnetic disk storage, or other magnetic storage devices, flash memory, or any other medium that can be used to store desired program code in the form of instructions or data structures and that can be accessed by a computer. Also, any connection is properly termed a computer-readable medium. For example, if instructions are transmitted from a website, server, or other remote source using a coaxial cable, fiber optic cable, twisted pair, digital subscriber line (DSL), or wireless technologies such as infrared, radio, and microwave, then the coaxial cable, fiber optic cable, twisted pair, DSL, or wireless technologies such as infrared, radio, and microwave are included in the definition of medium. It should be understood, however, that computer-readable storage media and data storage media do not include connections, carrier waves, signals, or other transitory media, but are instead directed to non-transitory, tangible storage media. Disk and disc, as used herein, includes compact disc (CD), laser disc, optical disc, digital versatile disc (DVD), floppy disk and Blu-ray disc, where disks usually reproduce data magnetically, while discs reproduce data optically with lasers. Combinations of the above should also be included within the scope of computer-readable media.

Instructions may be executed by one or more processors, such as one or more DSPs, general purpose microprocessors, ASICs, FPGAs, or other equivalent integrated or discrete logic circuitry. Accordingly, the terms "processor" and "processing circuitry," as used herein may refer to any of the foregoing structures or any other structure suitable for implementation of the techniques described herein. In addition, in some aspects, the functionality described herein may be provided within dedicated hardware and/or software modules configured for encoding and decoding, or incorporated in a combined codec. Also, the techniques could be fully implemented in one or more circuits or logic elements.

The techniques of this disclosure may be implemented in a wide variety of devices or apparatuses, including a wireless handset, an integrated circuit (IC) or a set of ICs (e.g., a chip set). Various components, modules, or units are described in this disclosure to emphasize functional aspects of devices configured to perform the disclosed techniques, but do not necessarily require realization by different hardware units. Rather, as described above, various units may be combined in a codec hardware unit or provided by a collection of interoperative hardware units, including one or more processors as described above, in conjunction with suitable software and/or firmware.

Various examples have been described. These and other examples are within the scope of the following claims.

What is claimed is:

1. A method of decoding video data, the method comprising:
- determining to use a spatial geometric partition mode (SGPM) for a current block of the video data;
- performing a Sobel-based intra prediction direction derivation for the current block;
- determining a first intra prediction mode of a plurality of intra prediction modes based on an output of the Sobel-based intra prediction direction derivation;
- determining a second intra prediction mode of the plurality of intra prediction modes based on the output of the Sobel-based intra prediction direction derivation;
- determining a first set of transforms based on the first intra prediction mode;
- determining a second set of transforms based on the second intra prediction mode; and
- decoding the current block based on the SGPM, and at least one of the first set of transforms or the second set of transforms.

2. The method of claim 1, wherein applying the Sobel-based intra prediction direction derivation comprises:
- applying a decoder-side intra mode derivation (DIMD) process to prediction block samples associated with the current block; and
- generating a histogram of gradients (HoG).

3. The method of claim 2, wherein the first intra prediction mode comprises a highest HoG of the output of the Sobel-based intra prediction direction derivation.

4. The method of claim 3, wherein the second intra prediction mode comprises a second highest HoG of the output of the Sobel-based intra prediction direction derivation.

5. The method of claim 1, wherein the first set of transforms comprises at least one of one or more non-separable primary transform (NSPT) or one or more low frequency non-separable transform (LFNST).

6. The method of claim 1, wherein determining the first set of transforms based on the first intra prediction mode comprises looking up the first intra prediction mode in a lookup table, and wherein determining the second set of transforms based on the second intra prediction mode comprises looking up the second intra prediction mode in the lookup table.

7. The method of claim 1, further comprising:
- determining a first transform, the first transform being a transform of the first set of transforms or the second set of transforms,
- wherein decoding the current block based on the SGPM, and at least one of the first set of transforms or the second set of transforms comprises decoding the current block using the first transform.

8. The method of claim 7, wherein determining the first transform comprises:
- receiving, in a bitstream, a syntax element whose value is indicative of the first transform; and
- parsing the syntax element to determine the value, the value representing an index of the first set of transforms or the second set of transforms.

9. The method of claim 1, wherein the current block is a first current block, the method further comprising:
- determining to decode a second current block of the video data using a matrix intra prediction (MIP) mode;
- performing the Sobel-based intra prediction direction derivation to up sampled prediction samples associated with the second current block to determine a third intra prediction mode;
- determining a transform set based on the third intra prediction mode; and
- decoding the second current block based on the MIP mode and the transform set.

10. A device for decoding video data, the device comprising:
- one or more memories configured to store the video data; and
- one or more processors implemented in circuitry and operably coupled to the one or more memories, the one or more processors configured to:
  - determine to use a spatial geometric partition mode (SGPM) for a current block of the video data;
  - perform a Sobel-based intra prediction direction derivation for the current block;
  - determine a first intra prediction mode of a plurality of intra prediction modes based on an output of the Sobel-based intra prediction direction derivation;
  - determine a second intra prediction mode of the plurality of intra prediction modes based on the output of the Sobel-based intra prediction direction derivation;
  - determine a first set of transforms based on the first intra prediction mode;
  - determine a second set of transforms based on the second intra prediction mode; and
  - decode the current block based on the SGPM, and at least one of the first set of transforms or the second set of transforms.

11. The device of claim 10, wherein as part of applying the Sobel-based intra prediction direction derivation, the one or more processors are configured to:

apply a decoder-side intra mode derivation (DIMD) process to prediction block samples associated with the current block; and generate a histogram of gradients (HoG).

12. The device of claim 11, wherein the first intra prediction mode comprises a highest HoG of the output of the Sobel-based intra prediction direction derivation.

13. The device of claim 12, wherein the second intra prediction mode comprises a second highest HoG of the output of the Sobel-based intra prediction direction derivation.

14. The device of claim 10, wherein the first set of transforms comprises at least one of one or more non-separable primary transform (NSPT) or one or more low frequency non-separable transform (LFNST).

15. The device of claim 10, wherein as part of determining the first set of transforms based on the first intra prediction mode, the one or more processors are configured to look up the first intra prediction mode in a lookup table, and wherein as part of determining the second set of transforms based on the second intra prediction mode, the one or more processors are configured to look up the second intra prediction mode in the lookup table.

16. The device of claim 10, wherein the one or more processors are further configured to:

determine a first transform, the first transform being a transform of the first set of transforms or the second set of transforms, wherein as part of decoding the current block based on the SGPM, and at least one of the first set of transforms or the second set of transforms, the one or more processors are configured to decode the current block using the first transform.

17. The device of claim 16, wherein as part of determining the first transform, the one or more processors are configured to:

receive, in a bitstream, a syntax element whose value is indicative of the first transform; and parse the syntax element to determine the value, the value representing an index of the first set of transforms or the second set of transforms.

18. The device of claim 10, wherein the current block is a first current block, and the one or more processors are further configured to:

determine to decode a second current block of the video data using a matrix intra prediction (MIP) mode;

perform the Sobel-based intra prediction direction derivation to up sampled prediction samples associated with the second current block to determine a third intra prediction mode;

determine a transform set based on the third intra prediction mode; and decode the second current block based on the MIP mode and the transform set.

19. The device of claim 10, wherein the device comprises one or more of a camera, a computer, a mobile device, a broadcast receiver device, or a set-top box.

20. A method for encoding video data, the method comprising:

determining to use a spatial geometric partition mode (SGPM) for a current block of the video data;

performing a Sobel-based intra prediction direction derivation for the current block;

determining a first intra prediction mode of a plurality of intra prediction modes based on an output of the Sobel-based intra prediction direction derivation;

determining a second intra prediction mode of the plurality of intra prediction modes based on the output of the Sobel-based intra prediction direction derivation;

determining a first set of transforms based on the first intra prediction mode;

determining a second set of transforms based on the second intra prediction mode; and encoding the current block based on the SGPM, and at least one of the first set of transforms or the second set of transforms.

* * * * *